(12) United States Patent
Ohashi et al.

(10) Patent No.: US 7,343,549 B2
(45) Date of Patent: Mar. 11, 2008

(54) LAYOUT SYSTEM, LAYOUT PROGRAM, AND LAYOUT METHOD

(75) Inventors: Hirotaka Ohashi, Suwa (JP); Atsushi Nagahara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 428 days.

(21) Appl. No.: 10/652,496

(22) Filed: Sep. 2, 2003

(65) Prior Publication Data
US 2004/0078759 A1    Apr. 22, 2004

(30) Foreign Application Priority Data
Sep. 24, 2002  (JP) .............................. 2002-277975

(51) Int. Cl.
*G06F 17/00*    (2006.01)
(52) U.S. Cl. ................. 715/243; 715/221; 715/224; 715/246
(58) Field of Classification Search ................ 715/517, 715/520, 507, 505, 908
See application file for complete search history.

(56) References Cited

U.S. PATENT DOCUMENTS

| | | | |
|---|---|---|---|
| 6,324,545 B1 * | 11/2001 | Morag ......................... | 707/202 |
| 6,453,302 B1 * | 9/2002 | Johnson et al. ............... | 705/27 |
| 7,124,359 B2 * | 10/2006 | Suzuki et al. ............... | 715/517 |
| 2002/0046089 A1 * | 4/2002 | Zorn ............................ | 705/14 |
| 2002/0054035 A1 * | 5/2002 | Nitta .......................... | 345/204 |
| 2003/0163375 A1 * | 8/2003 | Dombrowski et al. ........ | 705/14 |
| 2003/0167250 A1 * | 9/2003 | Sash ............................ | 707/1 |

FOREIGN PATENT DOCUMENTS

| | | |
|---|---|---|
| EP | 0 971 295 A1 | 1/2000 |
| EP | 1 176 520 A2 | 1/2002 |

OTHER PUBLICATIONS

World Wide Web Consortium, Extensible Stylesheet Language(XSL), version 1.0, 6.4.0/6.4.10/6.4.11.

* cited by examiner

*Primary Examiner*—Doug Hutton
*Assistant Examiner*—Chau Nguyen
(74) *Attorney, Agent, or Firm*—Oliff & Berridge, PLC

(57) ABSTRACT

The invention provides a layout system suitable for producing an optimum layout when the attributes of the published information are not clearly determined in advance. The layout system can include a content distribution terminal that selects an article from the content registration DB and a page template from the template registration DB according to the number of characters of the selected article and produces a layout of the article according to the selected page template. Specifically, the total number of characters of an unpublished article is calculated, and the average number of characters in each of unprocessed pages is calculated on the basis of the total number of characters, the maximum number of pages and the current number of pages. Then, a page template with the number of publishable characters suitable for the calculated average number of characters is selected from the template registration DB.

7 Claims, 18 Drawing Sheets

300 USER PROFILE TABLE

| USER ID | DISTRIBUTION ADDRESS | CATEGORY No. | KEYWORD | DISTRIBUTION DATE | DISTRIBUTION TIME | LAYOUT No. | MAXIMUM NUMBER OF PAGES | FONT SIZE |
|---|---|---|---|---|---|---|---|---|
| Andy | Andy@aaa.com | 1700 | PROCESSOR | EVERYDAY | 5 | 2 | 2 | SMALL |
| Bill | Bill@bbb.com | 1501 | OS | WEEKDAY | 11 | 5 | 2 | SMALL |
| Candy | Candy@ccc.com | 201* | APPLICATION | WEEKEND | 9 | 6 | u | NORMAL |

```
<layout>
    500
    <image>  504      506
      <position>...</position>
    </line>
     502      508                510
    ...
    <best-article-length>300</best-article-length>

...

</layout>
```

| PAGE No. | TEMPLATE No. |
|---|---|
| 1 | 1 |
| 2 | 2 |
| 3 | 1 |
| 4 | 2 |
| ... | ... |

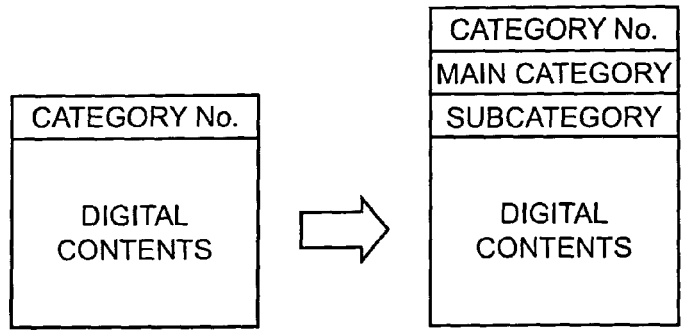

FIG. 10A

340 CATEGORY No.
CORRESPONDING TABLE

| CATEGORY No. | MAIN CATEGORY | SUBCATEGORY |
|---|---|---|
| 1102 | WORLD NEWS | AMERICA |
| 1135 | DISTRICT | TOKYO |
| 1122 | POLITICS | ELECTION |
| 1202 | WEATHER | TEMPERATURE OF THE WORLD |
| 1310 | BUSINESS | GENERAL FINANCIAL AFFAIRS |
| 2010 | SPORTS | BASEBALL |
| 2020 | SPORTS | FOOTBALL |
| 2030 | SPORTS | BASKETBALL |
| 2040 | SPORTS | HOCKEY |
| 2050 | SPORTS | SOCCER |
| 2070 | SPORTS | GOLF |
| 3000 | SPORTS | TENNIS |
| 1121 | FAVOR | HISTORY |
| 1500 | HEALTH | PREVENTION |
| 1401 | ENTERTAINMENT | TV |
| 1432 | TRAVEL | SIGHTSEEING TOUR |
| 1501 | SCIENCE & TECHNOLOGY | COMPUTER |

FIG. 10B

```
<layout>
      500
    <image>    504        506
      <position>...</position>
    </line>
          502       512              514
    <best-article-number>5</best-article-number>

...

</layout>
```

FIG. 15

```
<layout>
      500
    <image>    504        506
      <position>...</position>
    </line>
    ...    502       516                                518
    <best-article-category>economy</best-article-category>

...

</layout>
```

FIG. 17

```
<layout>
    ~500
    <image>  ~504      ~506
      <position>...</position>
    </line>~
    ...       ~502      ~520                              ~522
    <best-article-importance>50</best-article-importance>

...

</layout>
```

FIG. 19

LAYOUT SYSTEM, LAYOUT PROGRAM, AND LAYOUT METHOD

BACKGROUND OF THE INVENTION

1. Field of Invention

The present invention relates to layout systems, layout programs, and layout methods for producing a layout of published information, such as documents, images, and the like. More specifically, the invention to a layout system, a layout program, and a layout method suitable for producing an optimum layout of published information when the attributes of the published information are not clearly determined in advance.

2. Description of Related Art

Conventionally, there has been a technique to produce a layout of published information, such as documents, images, and the like, as described in World Wide Web Consortium 'Extensible Stylesheet Language (XSL) Version 1.0', Chapters 6.4.9, 6.4.10 and 6.4.11, Oct. 15, 2001, by using a method of producing a layout by using a eXtensible Sylesheet Language ("XSL"), a standard form of World Wide Web Consortium ("WWWC") document.

XSL is a specification for producing beautiful layouts of eXtensible Markup Language ("XML") documents to edit them. The concept of a page is not fully accepted in Hyper Text Markup Language ("HTML") and Cascading Style Sheets ("CSS") to standardize the style of HTML, but it is accepted in XSL for the purpose of printing onto paper. Therefore, for example, the following styles can be determined in XSL.

First, a layout format (including a printing format) can be set up at respective even or odd pages. That is, a phrase 'odd-or-even' is used for description. Secondly, a layout format can be set exclusively for the first, end or blank pages. This is described by using a phrase 'page-position'. Thirdly, it is possible to set the number of repetitions of a particular layout format, the number of pages to be covered by the layout format. This is described by using phrase 'maximum-repeats'.

A detailed description is made about the functions of the layout formats at pieces of XSL specification, 'fo: repeatable-page-master-alternatives', 'fo: repeatable-page-master-reference', and 'fo: conditional-page-master-reference'. A layout format of each page can be set by the functions of the aforementioned items.

SUMMARY OF THE INVENTION

However, the conventional layout method merely makes it possible to set a layout format at even or odd pages or exclusively at the first, end or blank page, but makes it difficult to set a proper layout format according to the information to be published. For example, in the case of producing a layout of and distributing article information like news, a large number of articles of the article information as an object to be published vary every day in terms of the length, number, content and importance of the respective articles. For this reason, even if a few templates (which define a layout format through a plurality of pages) are previously made, the templates cannot properly correspond to the amount of article information, or number, content or importance of articles, thereby bringing about damage to the layout of the article information.

The present invention has been made in order to solve the aforementioned problems of the prior art. It is therefore an object of the invention to provide a layout system, a layout program and a layout method suitable for producing an optimum layout of published information when the attributes of the published information are not clearly determined in advance.

In order to accomplish the object of the present invention, the invention provides a layout system including a layout device to produce a layout of published information, the layout device producing a layout by storing the published information in an information storage frame according to a template that defines items related to the information storage frame arranged in a predetermined layout region. The system can further include a template storage device that stores a plurality of different templates. The layout device can be adapted to select a template out of the template storage device according to attributes of the published information and to produce a layout of the published information according to the selected template.

In the system thus constructed, the layout device produces a layout by selecting a template out of template storage device according to attributes of the published information and storing the published information in the information storage frame according to the selected template.

At this time, respective templates may be constructed in separate files or data, or a single file or data. In other words, the total number of templates is not necessarily identical to that of files or data describing templates. Further, the attributes of the published information can be, for example, the amount, number, content and importance of published information. Further, published information includes character information, image information or other information.

Further, the "layout" device, for example, a display layout if a layout is produced for the purpose of displaying the published information on the screen, or a printing layout if a layout of published information is produced for the purpose of printing published information on paper.

Further, the system maybe embodied as a single device, terminal or other device. The system may be constructed as a network system in which a plurality of devices, terminals or other apparatuses are communicably connected to one another. In the latter case, respective elements may belong to any apparatus if only all the elements are communicably connected to one another.

Further, the template storage device stores the templates by any technique and at any time. The templates may be stored in the template storage device in advance. The templates may be stored by external input when the system is in operation, without storing the templates in advance.

Furthermore, the invention can provide a layout system including a published information storage device to store a plurality of pieces of published information, published information selection device to select the published information out of the published information storage device, and a layout device to produce a layout of the published information selected by the published information selection device, the layout device producing a layout by storing the published information in an information storage frame according to a template that defines items related to the information storage frame arranged in a predetermined layout region. The system can further include a template storage device to store a plurality of different templates. The layout device is adapted to select a template out of the template storage device according to the amount of published information selected by the published information selection device and to produce a layout of the published information according to the selected template.

In the system thus constructed, the published information selection device selects the published information out of the published information storage device, and the layout device selects a template out of the template storage device according to the amount of the selected published information and stores the published information in the published information storage frame according to the selected template, thereby producing a layout.

At this time, the published information storage device stores the published information by any technique and at any time. The published information may be stored in the published information storage device in advance. The published information may be stored by external input when the system is in operation, without storing the published information in advance.

Furthermore, the invention can provide the layout system described above, wherein the template is a page template that defines the shape, size, and arrangement of an information storage frame to be arranged in a layout region in page units. In the system thus constructed, the layout device selects a page template out of the template storage device according to the amount of information of the selected published information, and the published information is stored in the information storage frame according to the selected page template in each page, thereby producing a layout. Thus, a layout format is set up on each page.

Furthermore, the invention can provide the layout system described above, wherein the page template is related to information that indicates the amount of publishable information which can be stored in the information storage frame defined by a relevant page template. The layout device can be adapted to select out of the template storage device a page template that is suitable for the amount of published information selected by the published information selection device. In the system thus constructed, the layout device selects out of the template storage device a page template of the amount of publishable information that is suitable for the amount of the selected published information.

At this time, the information indicating the amount of publishable information may be related to any page template of the template storage device or to a part of the page templates. In other words, it is not necessarily related to all the page templates.

Furthermore, the invention can provide the layout system described above, wherein the layout device is adapted to calculate the total amount of published information which has been selected by the published information selection device but for which a layout has not been produced, to calculate the average amount of the published information on the basis of the calculated total amount of published information, and to select a page template of the amount of publishable information suitable for the calculated average amount of published information.

In the system thus constructed, the layout device can calculate the total amount of the selected published information for which a layout has not been produced, calculates the average amount of the published information on the basis of the calculated total amount of published information, and selects a page template of the amount of publishable information suitable for the calculated average amount of published information.

At this time, the average amount of information may be adopted as the average amount of published information for each page to which a layout is not produced or as the average of published information for each one item of published information for which a layout is not produced.

Furthermore, the invention can provide a layout system including a published information storage device to store a plurality of pieces of published information, published information selection device to select the published information out of the published information storage device, and layout device to produce a layout of the published information selected by the published information selection device, the layout device producing a layout by storing the published information in an information storage frame according to a template that defines items related to the information storage frame to be arranged in a predetermined layout region. The system can further include a template storage device to store a plurality of different templates. The layout device can be adapted to select a template out of the template storage device according to the number of pieces of published information selected by the published information selection device and to produce a layout of the published information according to the selected template.

In the system thus constructed, the published information selection device selects published information out of the published information storage device, and the layout device selects a template out of the template storage device according to the number of pieces of the selected published information. Then, the published information is stored in the information storage frame according to the selected template, thereby producing a layout.

Furthermore, the invention can provide the layout system of the above invention, wherein the template is a page template that defines the shape, size, and arrangement of an information storage frame to be arranged in a layout region in page units. In the system thus constructed, the layout device selects a page template out of the template storage device according to the number of pieces of the selected published information, and the published information is stored in the information storage frame according to the selected page template in each page, thereby producing a layout. Thus, a layout format is set up on each page.

Moreover, the invention can provide the layout system described above, wherein the page template is related to information that indicates a publishable number that can be stored in the information storage frame defined by a relevant page template, and the layout device can be adapted to select out of the template storage device a page template of the publishable number suitable for the number of pieces of published information selected by the published information selection device.

In the system thus constructed, the layout device selects a page template of the publishable number suitable for the number of pieces of the selected published information out of the template storage device.

At this time, the information indicating the publishable number may be related to all the page templates of the template storage device or to only some of the page templates of the template storage device. In other words, it is not necessarily related to all the page templates.

Further, the invention can provide the layout system described above, wherein the layout device is adapted to calculate the total number of pieces of published information which has been selected by the published information selection device but for which a layout has not been produced, to calculate the average number of pieces of published information by each page, where a layout is not produced for the published information, on the basis of the calculated total number of pieces of published information, and to select a page template of the publishable number suitable for the calculated average number of pieces of published information out of the template storage device.

In the system thus constructed, the layout device can calculate the total number of pieces of the selected published information for which a layout has not been produced, and calculates the average number of pieces of published information for each page, where a layout is not produced for the published information, on the basis of the calculated total number of pieces of published information. Then, a page template of the publishable number of information suitable for the calculated average number of pieces of published information out of the template storage device.

Furthermore, the invention can provide a layout system including a published information storage device to store a plurality of pieces of published information, published information selection device to select the published information out of the published information storage device, and layout device to produce a layout of the published information selected by the published information selection device, the layout device producing a layout by storing the published information in an information storage frame according to a template that defines items related to the information storage frame to be arranged in a predetermined layout region. The system can further include a template storage device to store a plurality of different templates. The layout device being adapted to select a template out of the template storage device according to the content of published information selected by the published information selection device and to produce a layout of the published information according to the selected template.

In the system thus constructed, the published information selection device can select published information out of the published information storage device, and the layout device selects a template out of the template storage device according to the content of the selected published information. Then, the published information is stored in the information storage frame according to the selected template, thereby producing a layout.

Furthermore, the invention can provide the layout system described above, wherein the template is a page template that defines the shape, size, and arrangement of an information storage frame to be arranged in a layout region in page units. In the system thus constructed, the layout device selects a page template out of the template storage device according to the content of the selected published information, and the published information is stored in the information storage frame according to the selected page template for each page, thereby producing a layout. Thus, a layout format is set up on each page.

Furthermore, the invention can provide the layout system described above, wherein the published information is related to information that indicates a category of relevant published information. The page template is related to information that indicates a recommended category of published information to be stored in the information storage frame defined by a relevant page template. The layout device is adapted to select out of the template storage device a page template with a recommended category suitable for the category of the published information selected by the published information selection device.

In the system thus constructed, the layout device selects a page template wth a recommended category suitable for the category of the selected published information out of the template storage device. At this time, the information indicating a recommended category may be related to all the page templates of the template storage device or to only some of page templates of the template storage device. In other words, it is not necessarily related to all the page templates. It is the same with the case in which the information indicating the category is related to all the published information.

Furthermore, the invention can provide the layout system described above, wherein the layout device is adapted to specify the most frequent category among those categories of published information to be published on each page among the published information which has been selected by the published information selection device but for which a layout has not been produced, and to select a page template with a recommended category suitable for the specific category out of the template storage device.

In the system thus constructed, the layout device specifies the most frequent category among those categories of the published information to be published on each page among the published information, which has been selected by the published information selection device, but for which a layout has not been produced, and selects a page template with a recommended category suitable for the specific category out of the template storage device.

Furthermore, the invention can provide a layout system including a published information storage device to store a plurality of pieces of published information, published information selection device to select the published information out of the published information storage device, and layout device to produce a layout of the published information selected by the published information selection device, the layout device producing a layout by storing the published information in an information storage frame according to a template that defines items related to the information storage frame to be arranged in a predetermined layout region. The published information is related to information that indicates the importance of the published information. The system can further include a template storage device to store a plurality of different templates. The layout device is adapted to select a template out of the template storage device according to the importance of the published information selected by the published information selection device, and to produce a layout of the published information according to the selected template.

In the system thus constructed, the published information selection device selects published information out of the published information storage device, and the layout device selects a template out of the template storage device according to the importance of the selected published information. The published information is stored in the information storage frame according to the selected template, thereby producing a layout.

At this time, the information indicating the importance may be related to all the published information of the published information storage device or to only some of pieces of the published information of the published information storage device. That is, it is not necessarily related to all the published information.

Furthermore, the invention can provide the layout system described above, wherein the template is a page template that defines the shape, size, and arrangement of an information storage frame to be arranged in a layout region in page units. In the system thus constructed, the layout device can select a page template out of the template storage device according to the importance of the selected published information and stores the published information in the information storage frame according to the selected page template of each page, thereby producing a layout. Thus, a layout format is set upon each page.

Further, the invention can provide the layout system described above, wherein the page template is related to information that indicates the recommended importance of published information to be stored in the information storage frame defined by the relevant page template. The layout device can be adapted to select out of the template storage device a page template with a recommended importance suitable for the importance of the published information selected by the published information selection device.

In the system thus constructed, the layout device can select a page template with the recommended importance suitable for the importance of the selected published information out of the template storage device. At this time, the information indicating the recommended importance may be related to all the page templates of the template storage device or to only some of page templates. In other words, it is not necessarily related to all the page templates.

Moreover, the invention can provide the layout system described above, wherein the layout device is adapted to specify the highest level of importance of those levels of importance of published information to be published on each page among the published information which has been selected by the published information selection device but for which a layout has not been produced, and to select a page template with recommended importance suitable for the specified importance out of the template storage device.

In the system thus constructed, the layout device specifies the highest level of importance of those levels of importance of published information to be published on each page among the selected published information for which a layout has not been produced. A page template with the recommended importance suitable for the specified importance is selected out of the template storage device.

Furthermore, the invention can provide the layout system described above, wherein the system can further include a user information storage device to store user information related to a user, and wherein the published information selection device is adapted to select published information out of the published information storage device based upon the user information in the user information storage device.

In the system thus constructed, the published information selection device selects published information out of the published information storage device based on user information in the user information storage device. At this time, user information includes the age, sex, interest, favor, address, name or operational environment of the terminal of a user, for example. Further, the user information storage device may store user information by any means and at any time. The user information may be stored in advance or may be stored by external input or the like, when the system is in operation, without storing the user information in advance.

Furthermore, the invention can provide the layout system described above, wherein the system can further include a user information storage device to store user information related to a user, and wherein the layout device produces a layout of the published information selected by the published information selection device on the basis of the user information in the user information storage device. In the system thus constructed, the layout device can produce a layout of the selected published information on the basis of the user information in the user information storage device.

At this time, the layout is produced on the basis of user information. If user's age is included in the user information and the user is relatively middle-aged, it can be considered to adopt a layout format having a relatively large font size. Further, if the user's sex is included in the user information, and if the user is a female, it's thought better to adopt a layout format in the form of a round letter. Further, if interest or favor is included in the user information, it can be considered to adopt a layout format of children's magazine style, sports newspaper style or technical document style according to the interest or favor. Further, if address is included in the user information, it can be considered to adopt a layout format having landscape specified in a land of the specific address as a background image. Further, if user's name is included in the user information, it can be considered to adopt a layout format having the title of the specific name. Furthermore, if the operational environment of the user terminal is included in the user information and if the user terminal has a low RAM capacity, it can be considered to adopt a layout format that does not use an image that requires a large data capacity as far as possible.

On the other hand, in order to accomplish the aforementioned object, the invention can provide a layout program for making a computer execute a process realized by the layout device in the layout system described above, wherein the layout device is adapted to select a template out of the template storage device according to attributes of the published information and to produce a layout of the published information according to the selected template. In the program thus constructed, if a computer reads a program and then executes a process according to the read program, it is possible to achieve the same effects as those of the layout system described above.

On the other hand, in order to accomplish the aforementioned object, the invention can provide a layout method including a layout step to produce a layout of published information, the layout step producing a layout by storing the published information in an information storage frame according to a template that defines items related to the information storage frame to be arranged in a predetermined layout region. The method can also include a template storing step of storing a plurality of different templates in the template storage device, wherein the layout step comprises selecting the template during the template storing step according to attributes of the published information, and producing a layout of the published information according to the selected template.

BRIEF DESCRIPTION OF THE DRAWINGS

The invention will be described with reference to the accompanying drawings, wherein like numerals reference like elements, and wherein:

FIG. 4 illustrates an exemplary data structure of a user profile table 300;

FIG. 10 illustrates the data structure of a digital contents and a category number corresponding table 340;

FIG. 10 is a flowchart illustrating an exemplary user registration process;

FIG. 15 illustrates an exemplary data structure of a page template;

FIG. 17 illustrates an exemplary data structure of a page template;

FIG. 19 illustrates an exemplary data structure of a page template; and

DETAILED DESCRIPTION OF PREFERRED EMBODIMENTS

Hereinafter, a first embodiment of the present invention will be described with reference to the drawings. FIGS. 1 to 14 illustrate a layout system, a layout program and a layout method according to the first embodiment of the present invention.

Figure 1:
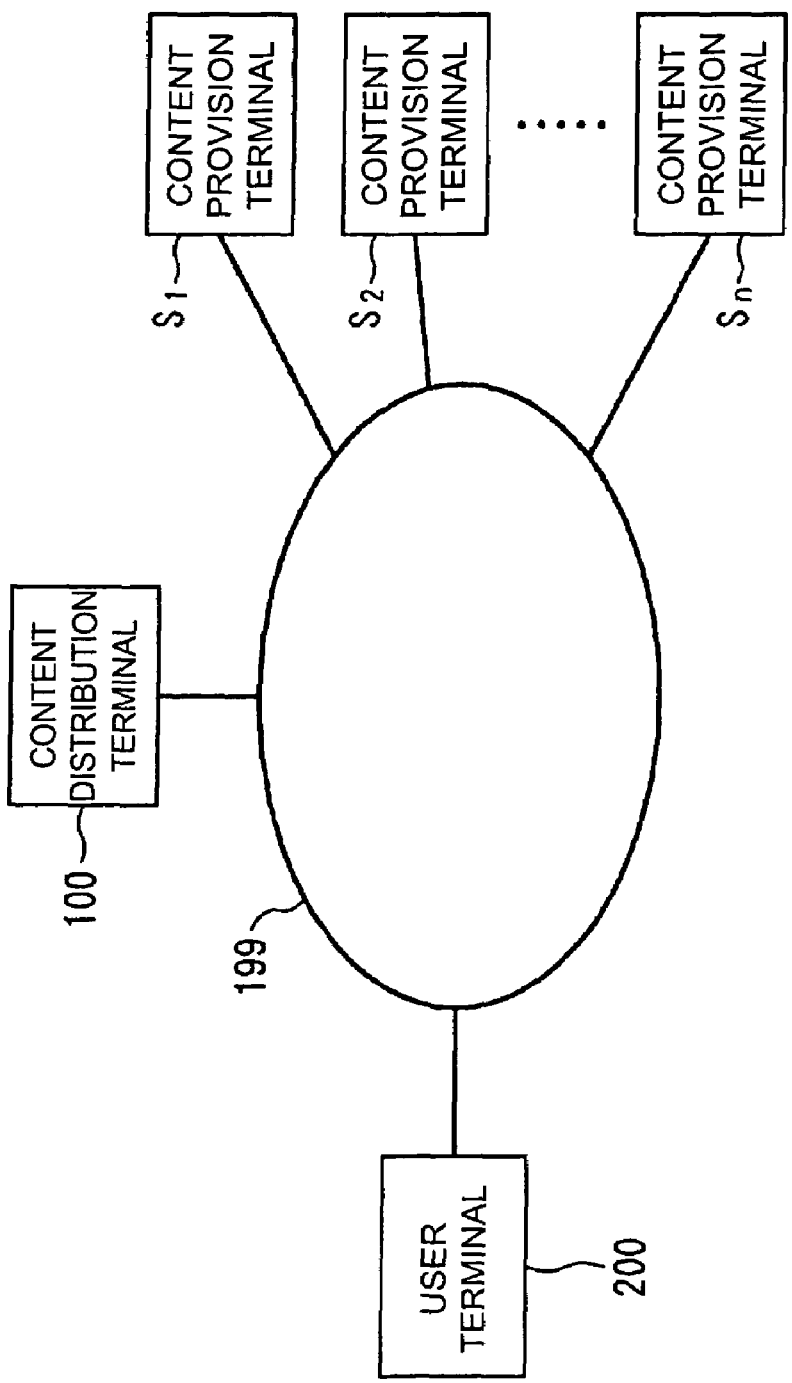
FIG. 1 is an exemplary block diagram illustrating the construction of a network system to which the present invention is applied.

In this embodiment, the layout system, layout program and layout method according to the first embodiment of the present invention, as shown in FIG. 1, are applied to distributing digital contents, such as news articles to a user terminal 200 in a content distribution terminal 100.

First, a construction of a network system to which the present invention is applied will be described with reference to FIG. 1. FIG. 1 is an exemplary block diagram illustrating the construction of a network system to which the present invention is applied. Connected to the Internet 199, as shown in FIG. 1, is a plurality of digital content provision terminals $S_1$ to $S_n$ to provide digital contents, a content distribution terminal 100 to collect and store and distribute digital contents (hereinafter, sometimes referred to as "article information" or "articles" for the digital contents provided from the content provision terminals $S_1$ to $S_n$) provided from the content provision terminals $S_1$ to $S_n$, and a user terminal 200 provided for users. Moreover, in order to facilitate the understanding of the present invention, a single user terminal 200 is illustrated, but a plurality of user terminals are actually connected to the Internet 199.

The content provision terminals $S_1$ to $S_n$ are constructed to have the same functions as a general computer in which the CPU, ROM, RAM, I/F, and the like are bus-connected, and adapted to, when digital contents have been made, add to the digital contents a category number for specifying a category of the digital contents, and then transmit the category number to the content distribution terminal 100. The category number will be described in greater detail below.

The user terminal 200 is constructed to have the same functions as a general computer to which the CPU, ROM, RAM, I/F, and the like are bus-connected, and it also has a World Wide Web (WWW) to access to the content distribution terminal 100 via the "WWW" browser.

Figure 2:
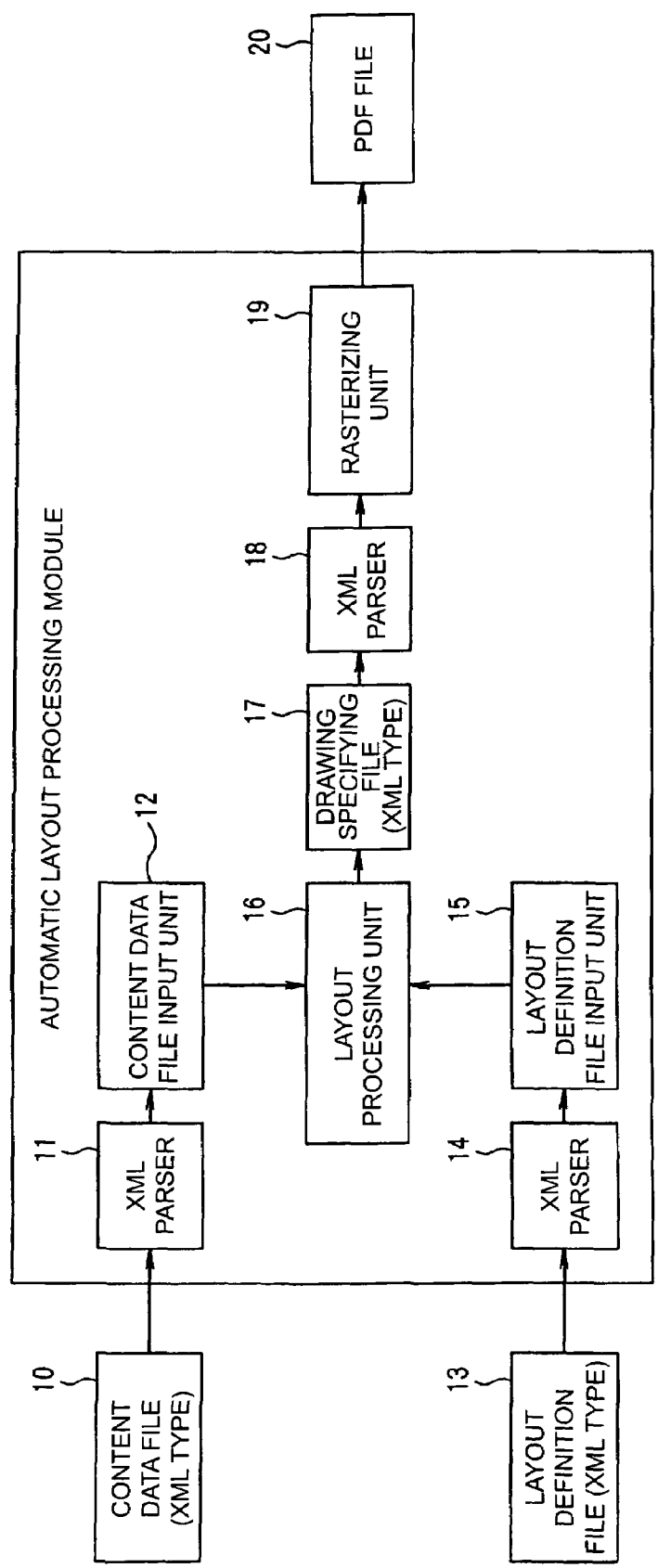
FIG. 2 is an exemplary functional block diagram illustrating the functional outline of a content distribution terminal 100.

Next, the functional outlines of the content distribution terminal 100 will be described in detail with reference to FIG. 2. FIG. 2 is an exemplary functional block diagram illustrating the functional outline of the content distribution terminal 100.

The content distribution terminal 100, as shown in FIG. 2, can include an Extensible Markup Language ("XML") parser 11 for interpreting an XML-type content data file 10, a content data file input unit 12 for inputting the content data file 10 interpreted by the XML parser 11, an XML parser 14 for interpreting an XML-type layout definition file (indicating a page template and a template application file) 13, a layout definition file input unit 15 for inputting the layout definition file 13 interpreted by the XML parser 14, a layout processing unit 16 for producing a layout on the basis of the content data file 10 and layout definition file 13 inputted by the input units 12, 15, an XML parser 18 for interpreting an XML-type drawing specifying file 17 from the layout processing unit 16, and a rasterizing unit 19 for making up a Portable Document Format ("PDF") type file 20 by drawing on the basis of the drawing specifying file 17 interpreted by the XML parser 18. This embodiment is characterized by, in particular, the layout processing unit 16 among the aforementioned elements.

Figure 3:
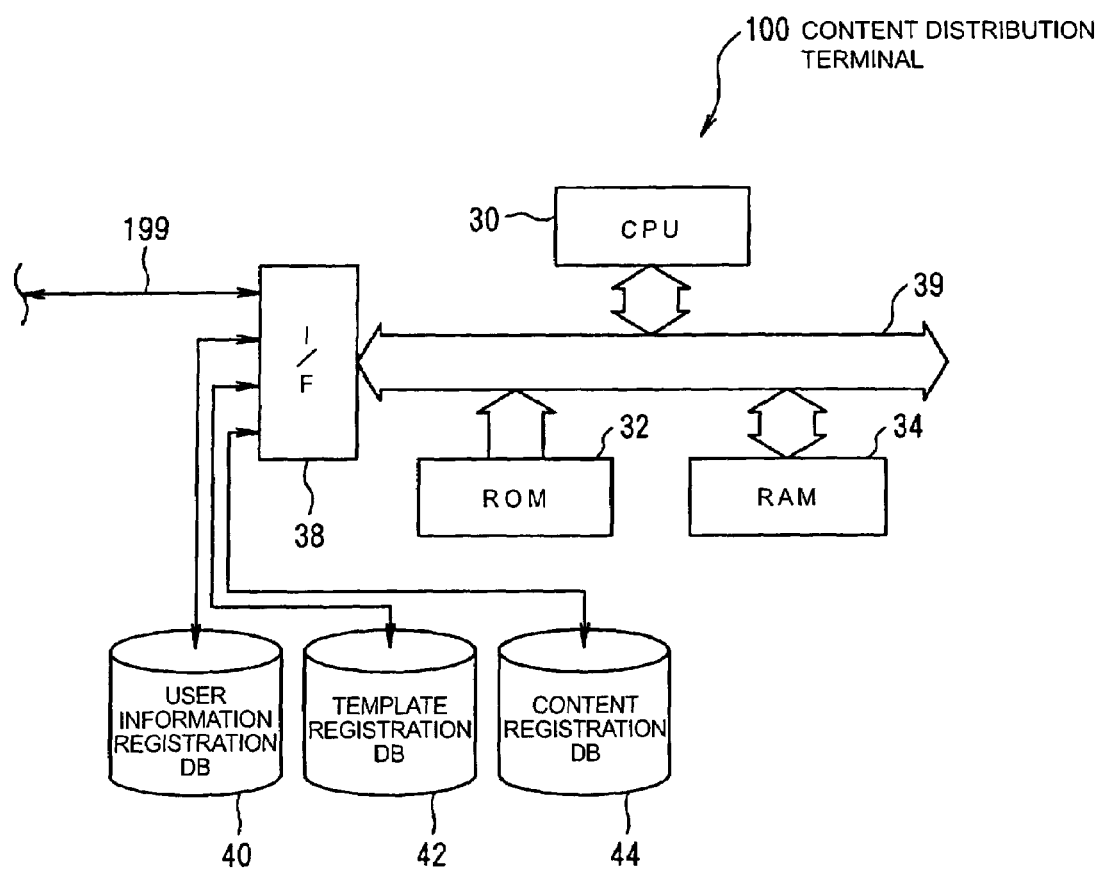
FIG. 3 is an exemplary block diagram illustrating the construction of the content distribution terminal 100.

Next, the construction of the content distribution terminal 100 will be described in detail with reference to FIG. 3. FIG. 3 is an exemplary block diagram illustrating the construction of the content distribution terminal 100.

The content distribution terminal 100, as shown in FIG. 3, can include a CPU 30 for calculating on the basis of a control program and controlling the whole system, a ROM 32 for previously storing a control program or the like of the CPU 30 in a predetermined region, a RAM 34 for storing the data read from the ROM 32 or the like or the results of calculation necessary for the calculation processes of the CPU 30 and an I/F 38 for mediating the input/output of data to external devices. These units are coupled to transmit and receive data via a bus 39, a signal line for the transmission of data.

Connected to the I/F 38 are, as external devices, a user information registration database (hereinafter, the database is simply abbreviated as "DB") 40 for registering user information, a template registration DB 42 for registering a page template prescribing frame combinations of a layout region in units of pages, a content registration DB 44 for collecting and storing the digital contents provided by the content provision terminals $S_1$ to $S_n$, and a signal line for connection to the Internet 199.

Next, the data structure of the user information registration DB 40 will be described with reference to FIG. 4. In the user information registration DB 40, as shown in FIG. 4, a user profile table 300 for registering user information is stored. FIG. 4 illustrates an exemplary data structure of the user profile table 300.

The user profile table 300, as shown in FIG. 4, is adapted to be capable of registering one or more records for each user. Each record can include a field 302 for registering a user ID for specifying users, a field 304 for registering distribution addresses of digital contents, a field 306 for registering category numbers, a field 308 for registering keywords, a field 310 for registering distribution dates, a field 312 for registering distribution time, a field 314 for registering layout numbers, a field 316 for registering the maximum number of pages and a field 318 for registering the font size.

In the field 308, user-designated-keywords are registered when the digital contents, including the keyword, is selected as an object to be distributed. The keyword, for example, is given as a keyword that seems to be frequently shown in the article of a category in which the user is interested. In the example of FIG. 4, a 'Processor' and 'Operating System (OS)' are respectively registered at the first and second steps of the field 308.

In the field 310, distribution dates, when the user wants the digital contents to be distributed, are registered. For example, 'everyday' is designated as a distribution date if the user wants the digital contents to be distributed everyday. If 'weekday' only is desired as the distribution date, 'weekday' is designated as the distribution date. If 'weekend' only is desired as the distribution date, 'weekend' is designated as the distribution date. In the example of FIG. 4, 'everyday' and 'weekday' are respectively registered at the first and second steps of the field 310.

In the field 312, the distribution time when the user wants the digital contents to be distributed at a date designated by the user is registered. For example, several points of time are designated as a distribution time when one day is represented by a 24-hour system from midnight to 11 o'clock. In the example of FIG. 4, '5 o'clock' and '11 o'clock' are respectively registered at the first and second steps of the field 312.

In the field 314, layout numbers are registered to specify an output layout for digital contents. For example, the layout number is designated as a layout number for specifying the output layout that the user wants. In the example of FIG. 4, layout No. 2 and layout No. 5 are respectively registered at the first and second steps of the field 314. Further, layout numbers will be described in greater detail below.

In the field 316, the maximum number of pages is registered as an upper limit when the digital contents are displayed or printed. Except when the maximum number of pages, for example, is designated as the maximum number of pages as an upper limit, while it may be designated as a symbol of 'u' indicating that the upper limit is not set. In the example of FIG. 4, '2 pages' and 'u' are respectively registered at the first and third steps of the field 316.

In the field 318, a font size to be used when digital contents are displayed or printed is registered. In the example of FIG. 4, 'small' and 'normal' are respectively registered at the first and third steps of the field 318.

Next, the data structure of the template registration DB 42 will be described in detail with reference to the drawings.

Figures 5, 6:
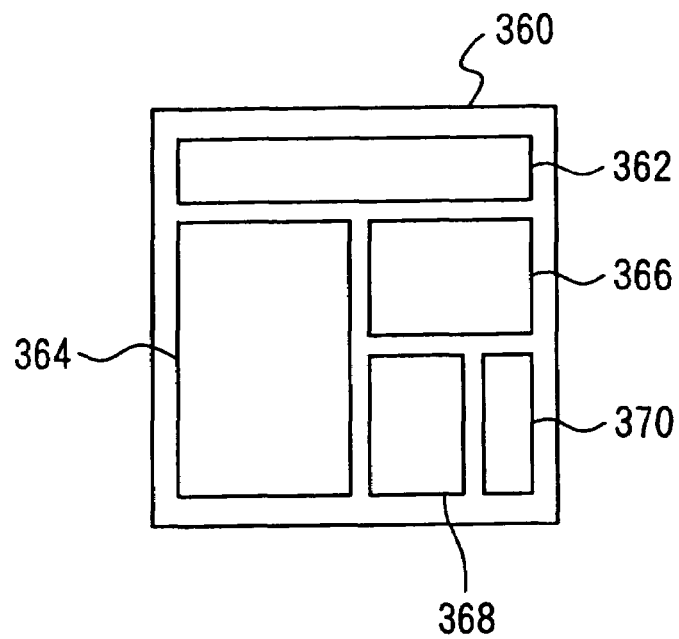
FIG. 5 illustrates an exemplary layout state defined by a page template.
FIG. 6 illustrates an exemplary data structure of a page template.

In the template registration DB 42, a plurality of different page templates are stored. The construction of the page templates will be described with reference to FIGS. 5 and 6. FIG. 5 illustrates an exemplary layout state that a page template defines, and FIG. 6 illustrates an exemplary data structure of a page template.

The page template, as shown in FIG. 5, defines a layout state in that a title information storage frame 362 for storing title information, a character information storage frame 364 for storing character information, an image information storage frame 366 for storing image information, another image information storage frame 368, and another character information storage frame 370 are arranged in a layout region 360. Further, if character information fails to be completely stored but flows out of the character information storage frame (although not shown herein), another character information storage frame (hereinafter referred to as a flow object storage frame) may be arranged in the layout region 360 with the sole purpose of storing the character information which could not have been stored in the first character information storage frame. It is taken for granted that an unused character information storage frame can be used as a flow object storage frame. Hereinafter, the character information or other information that has not been completely stored but flown out of the character information storage frame on the current or previous page will be referred to as "flow object." Moreover, FIG. 5 is only an example. The shape, size or number of information storage frame or the position to be arranged in the layout region 360 may be different depending on page templates.

The page template, as shown in FIG. 6, is adapted to set a layout format between a predetermined beginning tag (for example, ) and an ending tag (for example, ) by describing a set of beginning and ending tags. In the example of FIG. 6, a description is made about a first page template including a set of tags 500, 502 for setting an image information storage frame, another set of tags 504, 506 for setting an arrangement of an image information storage frame in the layout region 360, and a third set of tags 508, 510 for setting the number of publishable characters to be stored in the character information storage frame defined by the page template. The set of tags 508, 510 describes '300' which means that the number of publishable characters is 300. Further, in the example of FIG. 6, a plurality of page templates are described in one template definition, and each page template can be specified in the template definition file in the described order. For example, a page template of template number '3' designates a page template thirdly described in the template definition file.

Figures 7, 8:
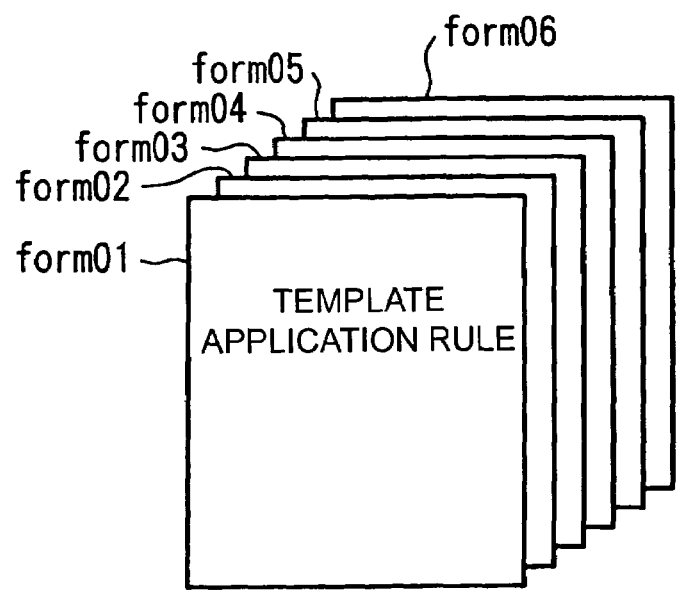
FIG. 7 illustrates an exemplary data structure of a template application rule.
FIG. 8 illustrates an exemplary data structure of a template application rule.

Further, a plurality of different template application rules form01 to form06 are stored in the template registration DB 42, as shown in FIG. 7. The construction of template application rules will be described with reference to FIGS. 7 and 8. FIGS. 7 and 8 illustrate a data structure of template application rules.

The template application rules define template rules to be applied to each layout region, assuming that the result of a layout reaches a plurality of regions. As shown in FIG. 8, one record is registered on each page. Each record includes fields 350, 352 for respectively registering the page number and template number to specify a page template.

In FIG. 8, '1' as the page number and '1' as the template number are registered in the first step of a record, which means that a page template of template number '1' should be applied to the layout region of page 1.

Figure 9:
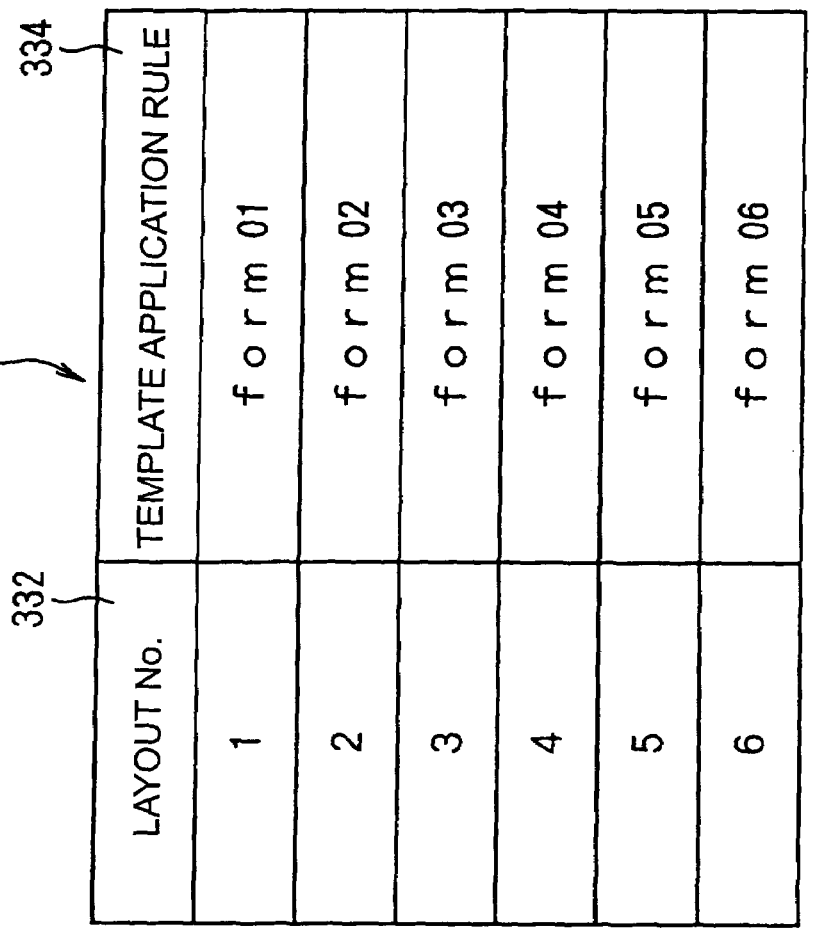
FIG. 9 illustrates an exemplary data structure of a layout number corresponding table 330.

Further, a layout number corresponding table 330 that shows a correspondence relationship between template application rules form01 to form06 and the layout numbers is stored in the template registration DB 42, as shown in FIG. 9. The construction of the layout number corresponding table 330 will be described with reference to FIG. 9. FIG. 9 illustrates an exemplary data structure of the layout number corresponding table 330.

As shown in FIG. 9, one record is registered at each layout number of the layout number corresponding table 330. Each record consists of fields 332, 334 for respectively registering layout number and template application rule name.

In the example of FIG. 9, '1' as the layout number and 'form01' as the template application rule name are registered in the first step of the record, and '2' as the layout number and 'form02' as the template application rule name are registered in the second step of the record.

Next, the data structure of content registration DB 44 will be described with reference to the drawings. As shown in FIG. 10, a category number corresponding table 340 that shows a correspondence relationship among digital contents provided from the content provision terminal $S_1$ to $S_n$, a main category, a subcategory and a category number. FIG. 10 illustrates a data structure of digital contents and category number corresponding table 340.

The digital contents provided from the content provision terminal $S_1$ to $S_n$ include an article number and a category number as shown in FIG. 10(a). The content distribution terminal 100 classifies the digital contents on the basis of a relevant category number and registers them in the content registration DB 44. Not only the article number and category number, but the main category and subcategory are added to the digital contents and then registered with reference to the category number corresponding table 340. Further, the digital contents consists of an article including title information showing the title of an article, image information related to the image of the article and character information related to sentences of the article.

In the category number corresponding table 340, as shown in FIG. 10(*b*), one record is registered for the individual main category and subcategory. Each record consists of a field 342 for registering the category number, a field 344 for registering the main category and a field 346 for registering the subcategory.

In the example of FIG. 10(*b*), '1102' as the category number, 'world news' as the main category and 'America' as the subcategory are respectively registered at the first step of the record, while '2010' as the category number, 'sports' as the main category and 'baseball' as the subcategory are respectively registered in the sixth step of the record.

Next, the construction of a CPU 30 and a process executed by the CPU 30 will be described with reference to FIGS. 11 and 12.

Figure 11:
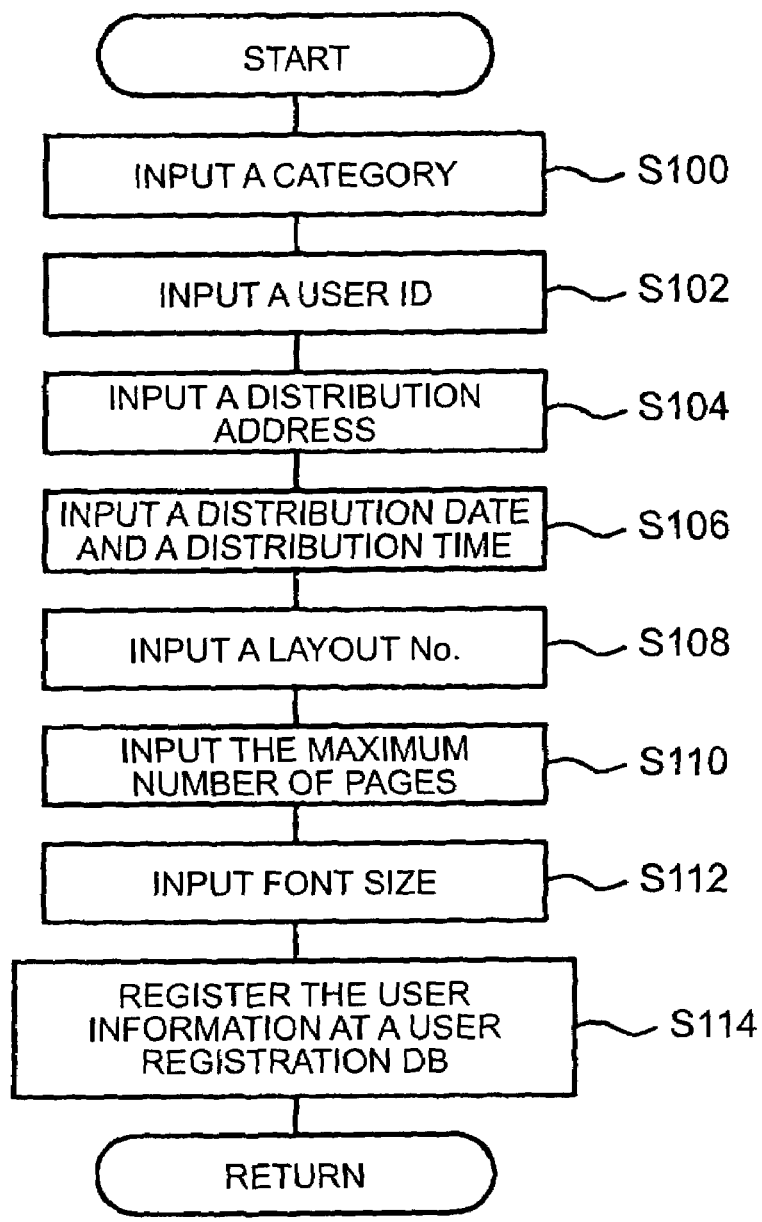
Figure 12:
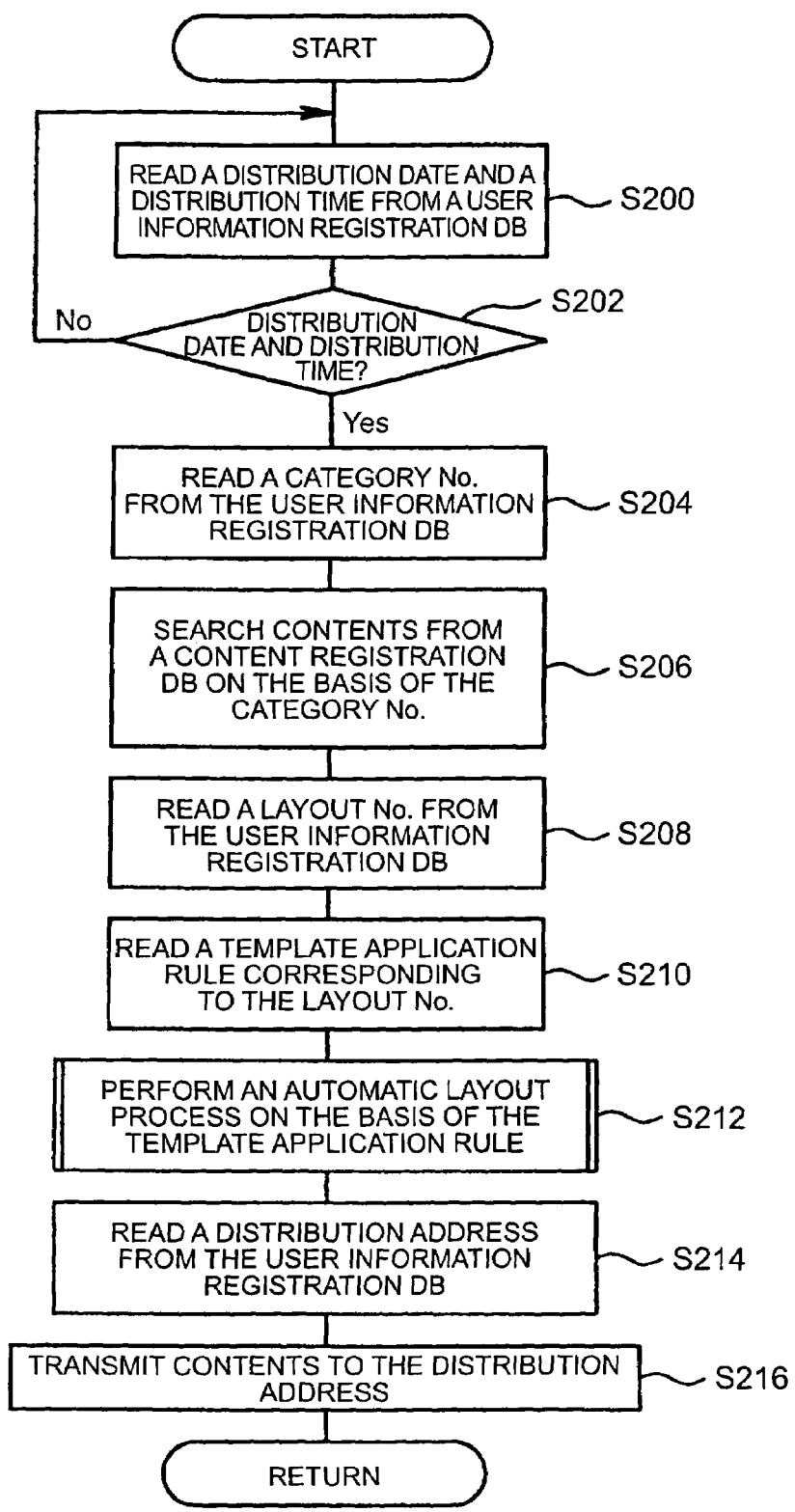
FIG. 12 is a flowchart illustrating an exemplary content distribution process.

The CPU 30 is composed of a micro-processing unit MPU or the like, operates a predetermined program stored in a predetermined region of a ROM 32, and the CPU is adapted to execute a user registration process and a content distribution process, respectively, as shown in the flowcharts of FIGS. 11 and 12 in a time-sharing way according to the program.

At first, the user registration process will be described in detail with reference to FIG. 11. FIG. 11 is a flowchart illustrating an exemplary user registration process.

The user registration process can include the requirements of inputting the necessary user information such as the ID of a user who accessed the program and of registering the inputted user information in the user profile table 300. If the process is performed in the CPU 30, the operation first proceeds to a step S100 as shown in FIG. 11. Further, hereinafter, all the inputs are made at each step by interactive communication with the user.

In step S100, a main category and a subcategory are inputted, and the operation proceeds to step S102 where the user ID and a password are inputted. Next, the operation proceeds to step S104 where a distribution address is inputted, and to step S106 where a distribution date and a distribution time are inputted. Next, the operation proceeds to step S108.

In step S108, a layout number is inputted, and the operation proceeds to step S110 where the maximum number of pages is inputted. Next, the operation proceeds to step S112 where a font size is inputted. Next, the operation proceeds to step S114 where the user information inputted in steps S100 to S112 is registered in the user profile table 300. The series of steps in the process are then finished, and the flow returns to the original processing step.

Next, a content distribution process will be described in detail with reference to FIG. 12. FIG. 12 is a flowchart illustrating an exemplary content distribution process. The content distribution process is a process to provide digital contents for a user terminal 200 with reference to the user profile table 300. First, if the CPU 30 performs the process as shown in FIG. 12, the operation proceeds to step S200. Further, hereinafter, all the steps in the process are operated for one record of the user profile table 300. In practice, the steps in the process will be performed by as many as the number of the records registered in the user profile table 300.

In step S200, a distribution date and a distribution time are read from the user profile table 300. The operation proceeds to step S202 where it is determined whether it is the date and time for the digital contents to be distributed on the basis of the read distribution date and distribution time. If it is determined that it is the date and time for the digital contents to be distributed (Yes), the operation proceeds to step S204. However, if it is determined that it is not the date and time for the digital contents to be distributed (No), the operation proceeds to step S200.

In step S204, a category number is read from the user profile table 300. The operation proceeds to step S206 where the digital contents in the template registration DB 42 is searched on the basis of the read category number and the digital contents having added thereto the category number identical to the read category number is searched out. The operation proceeds to step S208.

In step S208, a layout number is read from the user profile table 300. The operation proceeds to step S210 where a template application rule corresponding to the read layout number is read from the template registration DB 42 with reference to the layout number corresponding table 330. The operation proceeds to step S212 where an output layout for the digital contents searched out in step S206 is determined on the basis of the read template application rule and an automatic layout process is performed to compose the digital contents to be provided. Next, the operation proceeds to step S214.

In step S214, a distribution address is read from the user profile table 300. The operation proceeds to step S216 where the made-up digital contents for provision are distributed to the read distribution address. A series of steps in the process is finished and the flow returns to the original processing step.

Figure 13:
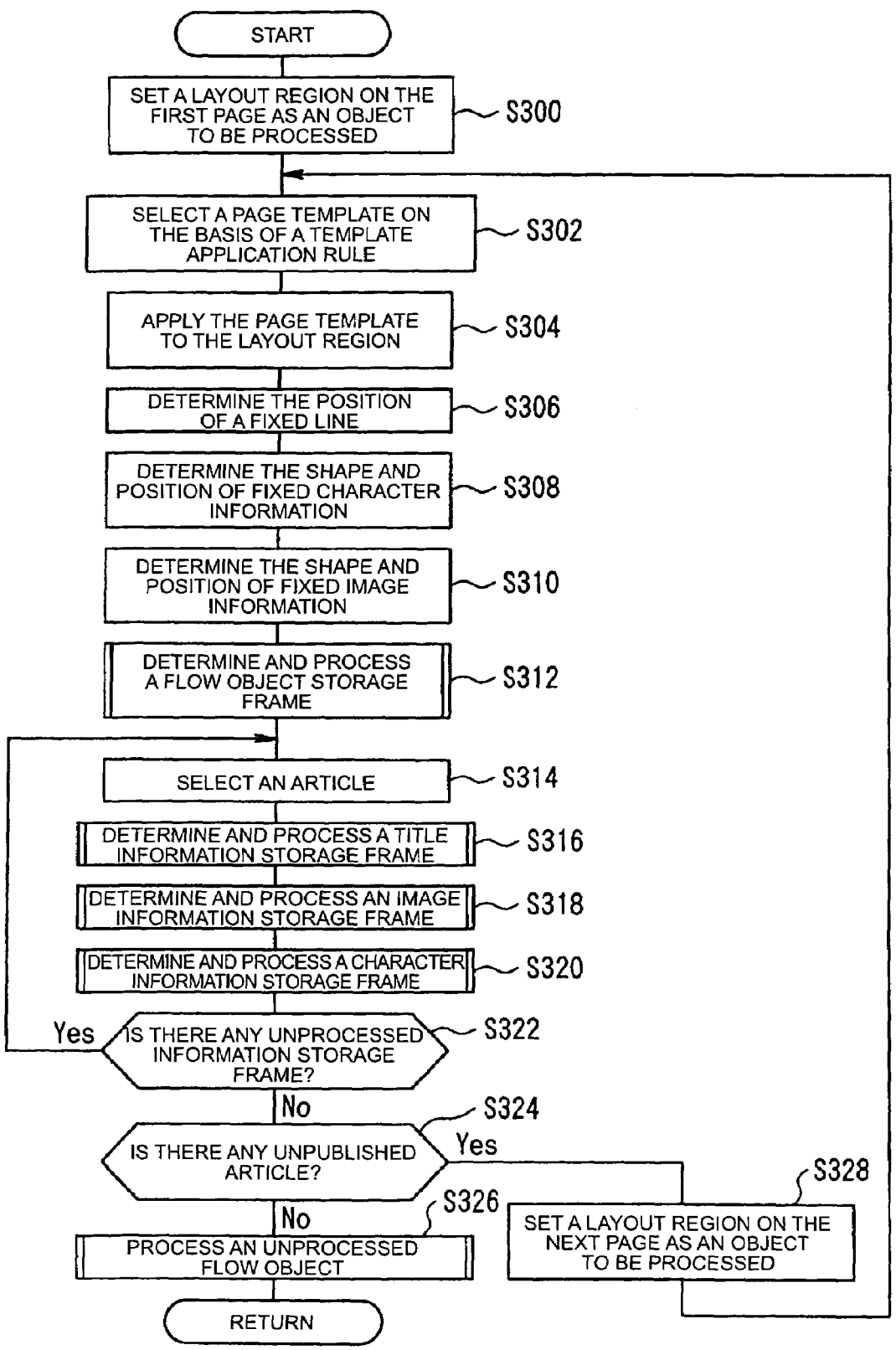
FIG. 13 is a flowchart illustrating an exemplary automatic layout process.

Next, the automatic layout process in step S212 will be described in detail with reference to FIG. 13. FIG. 13 is a flowchart illustrating an exemplary automatic layout process.

After the automatic layout process is performed in step S212, the operation first proceeds to step S300 as shown in FIG. 13. In step S300, a layout region in the first page is set as an object to be processed. Next, the operation proceeds to step S302 where a page template is read from the template registration DB 42 on the basis of the template application rule read from step S210. Then, the operation proceeds to step S304 where the read page template is applied to the layout region of the current page. Then, the operation proceeds to step S306.

In step S306, a position of a fixed line that is fixedly arranged in the page is determined. Then, the operation proceeds to step S308 where the shape and position of fixed character information that is fixedly arranged in the page are determined, and then to step S310 where the shape and position of fixed image information that is fixedly arranged in the page are determined. Next, the operation proceeds to step S312.

In step S312, the shape and position of the flow object storage frame are determined and the process of storing the flow object in the flow object storage frame is performed. Then, the operation proceeds to step S314 where an article to be arranged in the layout region is selected from all the digital contents searched out in step S206 on the basis of a predetermined level of priority. Next, the operation proceeds to step S316.

In step S316, the shape and position of the title information storage frame are determined on the basis of the article selected in step S314, and the process of storing the title information included in the selected article in the title information storage frame is performed. Next, the operation proceeds to step S318 where the shape and position of the image information storage frame are determined on the basis of the selected article, and the process of storing the image information included in the selected article in the image information storage frame is performed. Next, the operation proceeds to step S320 where the shape and position of the character information storage frame are determined on the basis of the selected article, and the process of storing the character information included in the selected article in the character information storage frame is performed. Next, the operation proceeds to step S322.

In step S322, it is determined whether there is an unprocessed information storage frame in the layout region. If it is determined that there is no unprocessed information storage frame (No), the operation proceeds to step S324 where it is determined whether there is an unpublished article among digital contents searched out in step S206. If it is determined that there is no unpublished article (No), the operation proceeds to step S326 where the process of publishing the unprocessed flow object is performed. A series of steps in the process is completed and the flow returns to the original processing step.

On the other hand, in step S324, if it is determined that there is an unpublished article (Yes), the operation proceeds to step S328 where a layout region in the next page is set as an object to be processed and to step S302.

On the other hand, if it is determined in step S322 that there is an unprocessed information storage frame in the layout region (Yes), the operation proceeds to step S314.

Figure 14:
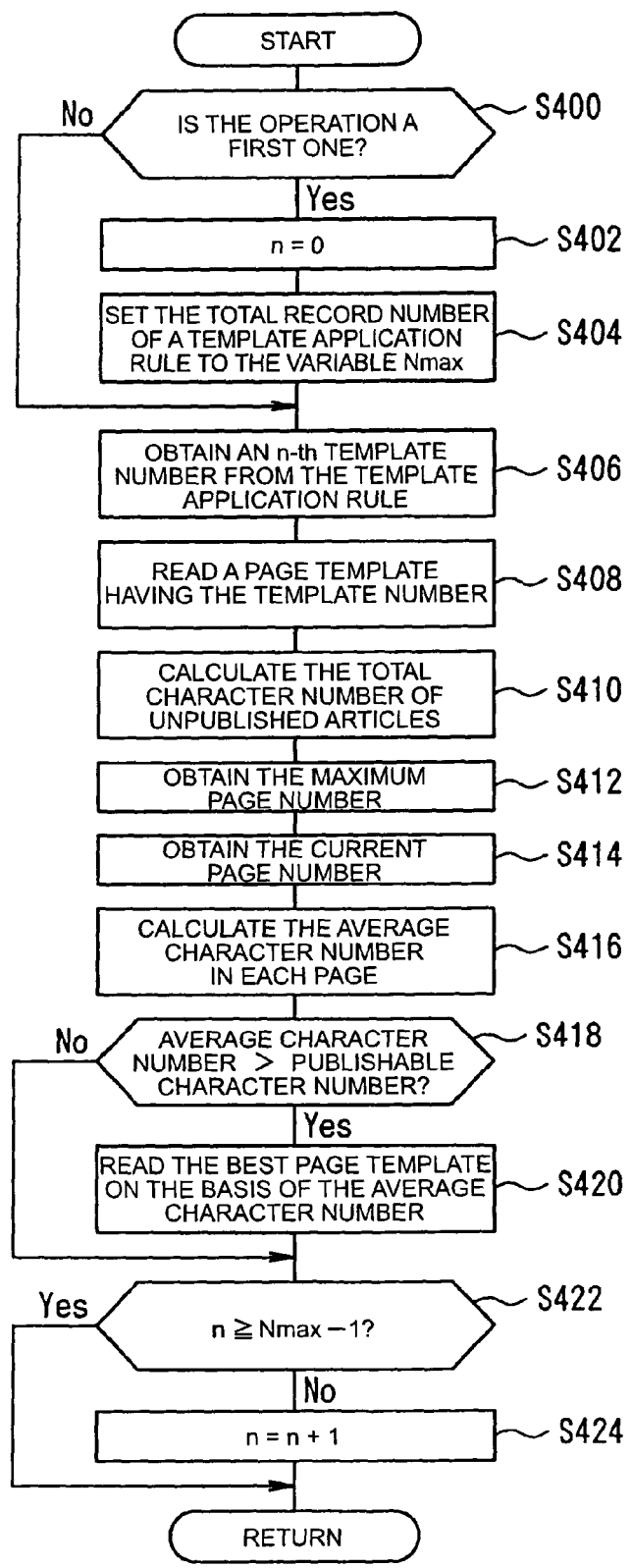
FIG. 14 is a flowchart illustrating an exemplary page template selection process.

Next, a page template selection process in step S302 will be described in detail with reference to FIG. 14. FIG. 14 is a flowchart illustrating an exemplary page template selection process.

If the page template selection process is performed in step S302, the operation firstly proceeds to step S400 as shown in FIG. 14. In step S400, it is determined whether the operation of step S400 is a first one or not. If it is determined that it is the first operation (Yes), the operation proceeds to step S402 where the variable n is set to '0' and to step S404 where the total record number of a template application rule is set to the variable $N_{max}$. Next, the operation first proceeds to step S410.

In step S406, a template number having a specific order of the value of the variable n among the records of the template application rule is obtained. The operation proceeds to step S408 where a page template having the obtained template number is read from the template registration DB 42 and to step S410.

In step S410, a calculation is made for the total character number of all the unpublished articles from digital contents searched out in step S206. The operation proceeds to step S412 where the maximum page number is read from the user profile table 300, and to step S414 where the page number of the layout region to be processed (hereinafter, simply referred to as "current page") is obtained. The operation proceeds to step S416.

In step S416, a calculation is made for an average character number per page of all the unprocessed pages on the basis of the calculated total character number, the read maximum page number and the obtained current page number. Specifically, the average character number $N_{ave}$ can be calculated with $N_{sum}$ as a total character number and $P_{max}$ as a maximum page number and $P_{cur}$ as a current page number by the following expression:

$$N_{ave}=N_{sum}/(P_{max}-P_{cur}) \quad (1)$$

Then, the operation proceeds to step S418 where it is determined whether the calculated average character number, $N_{ave}$, is greater than the publishable character number of the page template read in step S408. If it is determined that the average character number, $N_{ave}$, is greater than the publishable character number (Yes), the operation proceeds to step S420 where a page template of the publishable character number suitable for the average character number $N_{ave}$ is read from the template registration DB 42 and to step S422.

In step S422, it is determined whether the value of the variable n is higher than or equal to the value obtained by subtracting '1' from the value of the variable $N_{max}$. If it is determined that the value of the variable n is less than the value obtained by subtracting '1' from the value of the variable $N_{max}$ (No), the operation proceeds to step S424 where a new value for the variable n is set by adding '1' to the value of the variable n. A series of steps of the process is finished and the flow returns to the original processing step.

On the other hand, if it is determined that the value of the variable n is higher than or equal to the value obtained by subtracting '1' from the value of the variable $N_{max}$ (Yes), a series of steps of the process is finished and the flow returns to the original processing step.

On the other hand, if it is determined in step S418 that the average character number $N_{ave}$ is equal to or less than the publishable character number (No), the operation proceeds to step S422.

On the other hand, if it is determined in step S400 that the operation in step S400 is not the first one, the operation proceeds to step S406.

Next, an operation of this embodiment will be described.

First, a description will be made about registration of information required to distribute digital contents. If a user wants the digital contents to be distributed, the user accesses the content distribution terminal 100 through the "WWW" browser in the user terminal 200 and inputs a user registration request.

At the user terminal 200, if the user registration request is inputted, the request to input all the necessary user information is made to the user through communication with the content distribution terminal 100. At this time, in response to the inputting request, the user inputs the user information such as the main category, subcategory, user ID, password, distribution address, distribution date, distribution time, layout number, maximum page number and font size. Then, the user information is transmitted to the content distribution terminal 100.

If the content distribution terminal 100 receives the user information along with the registration request, the received user information is processed through steps S100 to S104 and registered in the user profile table 300.

Next, a description will be made with reference to the user profile table 300 about distribution of the digital contents.

If it falls on the distribution date of digital contents with reference to the user profile table 300, the content distribution terminal 100 operates steps S204, S206 to read the category number from the user profile table 300, to search the digital contents of the content registration DB 44 on the basis of the read category number and to search out the digital contents having added thereto the category number identical to the read category number. Next, steps S208 to S212 are performed to read the layout number from the user profile table 300 and a template application rule corresponding to the read layout number from the user information registration DB 40 with reference to the layout number corresponding table 330, to determine an output layout for the searched-out digital contents on the basis of the read template application rule and to construct the digital contents to be provided.

In the course of the layout process, steps S300, S400 to S404 are performed to set the layout region of the first page as an object to be processed, '0' as the variable n, and the variable $N_{max}$ as the total record number of template application rule. Next, step S406 is performed to obtain a template number from a record in the order specified by the value of the variable n among all the records of the template application rule. At this time, the value of the variable n is '0', so that a template number is obtained from the first record of the template application rule. Then, step S408 is performed to read a page template with the obtained template number from the template registration DB 42.

Further, steps S410 to S414 are performed to calculate the total number of characters $N_{sum}$ of the unpublished article, to read the maximum page number, $P_{max}$, and obtain the current page number, $P_{cur}$. Next, step S416 is performed to calculate the average number of characters $N_{ave}$ for each of the unprocessed pages according to the aforementioned expression (1) on the basis of the total number of characters $N_{sum}$, the maximum page number, $P_{max}$, and the current page number, $P_{cur}$. At this time, if the average number of characters $N_{ave}$ is greater than the publishable number of characters of the page templates read in step S408, it is impossible to secure the publishable number of characters required to store an article. Therefore, step S420 is performed to read a page template having the publishable number of characters suitable for the average number of characters $N_{ave}$ from the template registration DB 42. In other words, instead of the page template read in step S408, the page template read in step S420 is used. Then, steps S422, S424 are performed to set a new value for the variable n by adding '1' to the value of the variable n.

Next, steps S304 to S314 are performed to apply the read page template to a layout region of the current page to determine the position of a fixed line, the shape and position of fixed character information and the shape and position of fixed image information in sequence. Then, an article to be arranged in the layout region is selected from the digital contents searched out in step S206 on the basis of a predetermined level of priority.

If title information is included in the selected article, step S316 is performed to store the title information included in the selected article in the title information storage frame. Specifically, the amount of title information included in the selected article is calculated and the shape and position of the title information storage frame are determined on the basis of the calculated amount of information. Then, the title information included in the selected article is stored in the title information storage frame.

If image information is included in the selected article, step S318 is performed to store the image information included in the selected article in the image information storage frame. Specifically, the amount of image information included in the selected article is calculated and the shape and position of the image information storage frame are determined on the basis of the calculated amount of information so as not to overlap the image storage frames. Then, the image information included in the selected article is stored in the image information storage frame.

If character information is included in the selected article, step S320 is performed to store the character information included in the selected article in the character information storage frame. Specifically, the amount of character information included in the selected article is calculated, and the shape and position of the character information storage frame are determined on the basis of the calculated amount of information so as not to overlap the image storage frames. Then, the character information included in the selected article is stored in the character information storage frame. At this time, if the character information is not completely stored but flows over the character information storage frame, the flow object is conserved.

Then, the processes of storing in the title information storage frame, image information storage frame and character information storage frame are repeated until there is no unprocessed information storage frame in the layout region. Therefore, an article is arranged in the layout region of the first page.

Further, since the average number of characters $N_{ave}$ is equal to or smaller than the publishable number of characters of the page template read in step S408, the publishable number of characters required to store the article is secured. For this reason, the page template read in step S408 is applied to the layout region of the current page. Therefore, a layout is produced according to the template application rule.

Next, if there is no unprocessed information storage frame in the layout region, steps S328, S400, S406 are performed to set the layout region of the following page as an object to be processed, and a template number is obtained from a record in the order specified by the value of the variable n among the records of the template application rule. At this time, the value of the variable n is '1', so that a template number is obtained from the second record of the template application rule. The following processes are the same as the ones described above. If the average number of characters $N_{ave}$ is greater than the publishable number of characters of the page template read in step S408, the page template with the publishable number of characters suitable for the average number of characters $N_{ave}$ is read from the template registration DB 42. Then, steps S422, S424 are performed to set a new value for the variable n by adding '1' to the value of the variable n.

Next, if the flow object is conserved, and if there is a flow object storage frame in the layout region, step S312 is performed to store the flow object in the flow object storage frame. Specifically, the amount of the flow object information is calculated, the shape and position of the flow object storage frame is determined on the basis of the calculated amount of information, and the shape and position of other information storage frames are also determined so as not to overlap the image storage frames, so that the flow object is stored in the flow object storage frame. Next, the processes of storing in the title information storage frame, image information storage frame and character information storage frame are repeated, similar to the above, until there is no unprocessed information storage frame in the layout region.

Then, the storing processes to the aforementioned flow object storing range, title information storage frame, image information storage frame, character information storage frame are repeated until there is no unpublished article in the digital contents searched out in step S206. As a result, all the articles included in the searched-out digital contents are published to determine the output layout of digital contents. If the output layout is determined, steps S222, S224 are performed to read the distribution address from the user profile table 300 and to distribute the made-up digital contents for provision to the read distribution address.

As described above, in this embodiment, the content distribution terminal 100 is adapted to select an article from the content registration DB 44 and a page template from the template registration DB 42 according to the number of characters of the selected article, thereby producing a layout of the article according to the selected page template.

As a result, even when the number of characters of an article is not clearly determined in advance, a relatively suitable layout can be produced compared to the prior art. Further, the layout is produced in combination of the page templates of each page, so that it is possible to set a layout format relative easily.

Moreover, in this embodiment, the content distribution terminal 100 selects a page template of the publishable number of characters suitable for the number of characters of an article from the content registration DB 42.

As a result, a layout is produced to be further suitable for the number of characters of an article. Therefore, even when the number of characters of the article is not clearly determined in advance, it becomes possible to produce optimum layout.

Furthermore, in this embodiment, the content distribution terminal 100 is adapted to calculate the total number of characters $N_{sum}$ of the unpublished article, and the average number of characters $N_{ave}$ in a page on the basis of the total number of characters $N_{sum}$, maximum page number, $P_{max}$, and current page number, $P_{cur}$, according to the aforementioned expression (1), and to select a page template of a publishable number of characters suitable for the calculated average number of characters $N_{ave}$ from the template registration DB 42.

As described above, a layout relatively suitable for the number of characters of an article can be stably produced through a plurality of pages. Thus, an optimum layout can be produced relatively easily as a whole even when the number of characters of an article is not clearly determined in advance.

Moreover, in this embodiment, the content distribution terminal 100 is adapted to select a page template from the template registration DB 42 at every layout region needed for a layout on the basis of the template application rule that defines page templates to be applied to each layout region, assuming that the result of a layout reaches a plurality of layout regions, and to produce a layout of the article according to the selected page template.

As a result, a layout format can be set arbitrarily for each page by simply making up a plurality of different page templates and the template application rule. Therefore, the layout format is set up relatively easily, so that it is possible to produce a relatively suitable layout even when the contents or amount of the article is not clearly determined in advance.

Moreover, in this embodiment, the content distribution terminal 100 is adapted to obtain template numbers from the template application rule in a predetermined sequence in every layout region that requires a layout, and to select a page template of the obtained template number from the template registration DB 42.

As a result, a template application rule can be produced by a simple arrangement of the template numbers, so that it becomes possible to easily produce the template application rule.

Furthermore, in this embodiment, when the flow object storage frame overlaps with other information storage frames, the content distribution terminal 100 determines the shape and position of the other information storage frames so as not to overlap with the flow object storage frame.

As a result, the arrangement of the flow object can be made in priority to that of the information to be stored in other information storage frames.

Furthermore, in this embodiment, the content distribution terminal 100 is adapted to search out digital contents from the content registration DB 44 on the basis of the user information of the user information registration DB 42.

As the user's inherent information or specified information is referred to for the selection of digital contents, it is possible to compose the digital contents for provision, relatively well suitable for user's desire.

Furthermore, in this embodiment, the content distribution terminal 100 is adapted to determine an output layout of digital contents to compose the digital contents for provision on the basis of the user information of the user information registration DB 40.

As user's inherent information or specified information is referred for determination of an output layout, it is possible to compose the digital contents for provision in the output layout relatively well suitable for user's desire.

Furthermore, in this embodiment, the content distribution terminal 100 can be adapted to determine the shape of the title information storage frame, image information storage frame and character information storage frame to be a minimum size thereof required to store the title information, image information or character information. As a result, it is possible to efficiently store the title information, image information or character information in the title information storage frame, image information storage frame or character information storage frame.

Further, in this embodiment, the content distribution terminal 100 can be adapted to determine the shape and position of the relevant information storage frames in the order of title information storage frame, image information storage frame and character information storage frame. As a result, a layout can be determined in the order of the importance of information, and, accordingly, the digital contents for provision can be made in a relatively easily viewable output layout.

Figure 16:
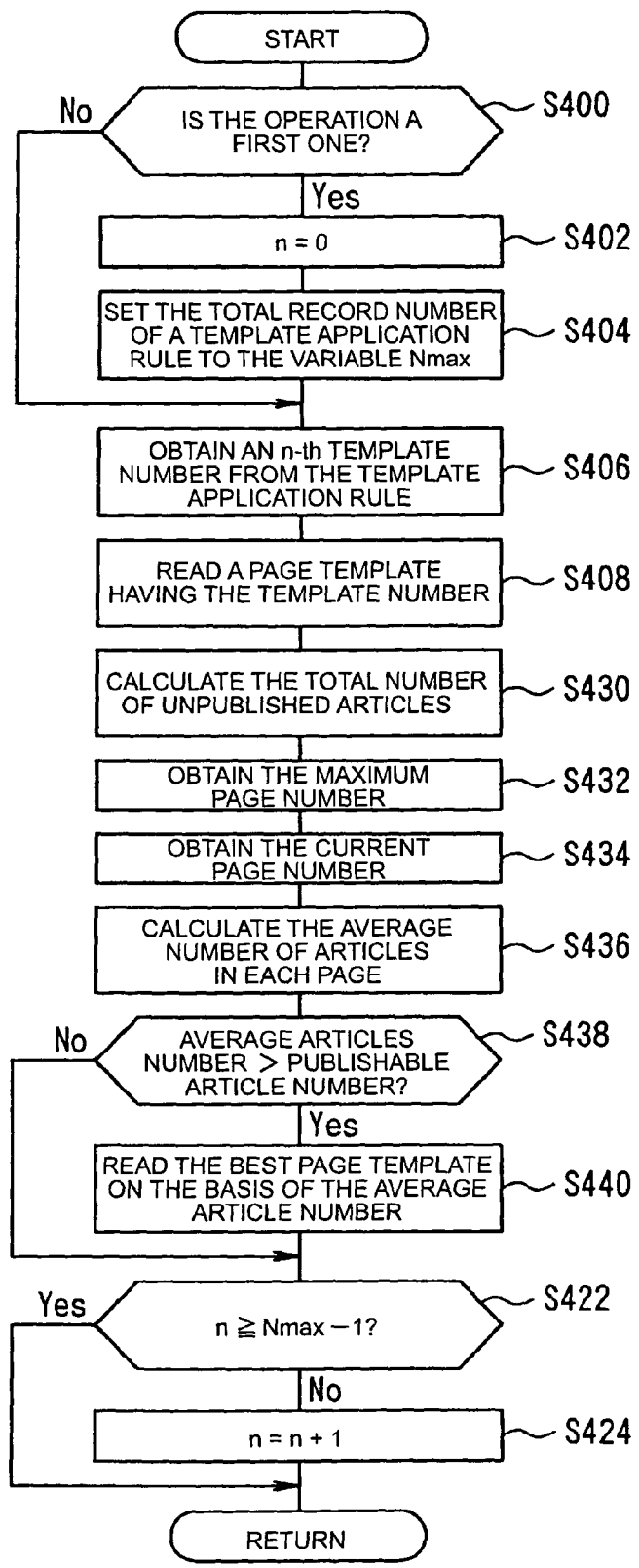
FIG. 16 illustrates a flowchart illustrating an exemplary page template selection process.

Next, the second embodiment of the present invention will be described with reference to the drawings. FIGS. 15 and 16 illustrate the second embodiment of a layout system, a layout program and a layout method according to the present invention.

This embodiment relates to the application of a layout system, a layout program and a layout method according to the present invention to the case in which the content distribution terminal 100 distributes the digital contents, such as news, to the user terminal 200. Different from the first embodiment, the second embodiment has the function of selecting a page template according to the number of articles. Further, hereinafter, a description will be made only about elements of the second embodiment different from those of the first embodiment. The same reference numerals will be given to elements of the second embodiment similar to those of the first embodiment and the description thereof will be omitted.

First, an exemplary data structure in the page template will be described in detail with reference to FIG. 15. FIG. 15 illustrates the data structure of page template.

The page template, as shown in FIG. 15, is adapted to set a layout format by describing a set of tags including a beginning tag and an ending tag between a predetermined beginning tag (for example, ) and an ending tag (). In the example of FIG. 15, a page template includes a tag set of tags 500, 502 for setting the image information storage frame, another tag set of tags 504, 506 for setting the arrangement of the image information storage frame in the layout region 360 and a third tag set of tags 512, 514 for setting the number of publishable articles that can be stored in the character information storage frame defined in the page template. '5' is described by the tag set of tags 512, 514, which means that the number of publishable articles is 5. Further, in the example of FIG. 15, a plurality of page templates are described in one template definition file, so then each page template can be specified by the description order of the template definition file.

The CPU 30 can be adapted to execute a page template selection process illustrated in the flowchart of FIG. 16 instead of that illustrated in the flowchart of FIG. 14. FIG. 16 is a flowchart illustrating an exemplary page template selection process.

After the page template selection process is performed in step S302, the operation first proceeds to step S400 as shown in FIG. 16.

In step S400, it is determined whether the operation of step S400 is the first one. If it is determined that the operation of step S400 is the first one (Yes), the operation proceeds to step S402 where '0' is set as the variable n and to step S404 where the total number of records of the template application rule is set as $N_{max}$. Then, the operation proceeds to step S406.

In step S406, a template number is obtained from a record in the order specified by the value of the variable n among the records of the template application rule. The operation proceeds to step S408 where the page template with the obtained template number is read from the template registration DB 42 and then to step S430.

In step S430, the total number of unpublished articles among the digital contents searched out in step S206 is calculated. The operation proceeds to step S432 where the maximum page number is read from the user profile table 300 and to step S434 where the current page number is obtained. Then, the operation proceeds to step S436.

In step S436, the average number of articles in each unprocessed page is calculated on the basis of the calculated total number of articles, the read maximum number of pages and the obtained current page number. Specifically, the average article number, $M_{ave}$, can be calculated with $M_{sum}$ as a total article number and $P_{max}$ as a maximum page number and $P_{cur}$ as a current page number by the following expression:

$$M_{ave}=M_{sum}/(P_{max}-P_{cur}) \quad (2)$$

Then, the operation proceeds to step S438 where it is determined whether the calculated average article number, $M_{ave}$, is greater than the publishable article number of the page template read in step S408. If it is determined that the average article number, $M_{ave}$, is greater than the publishable article number (Yes), the operation proceeds to step S440 where page templates of the publishable article number suitable for the average article number, $M_{ave}$, are read from the template registration DB 42 and to step S422.

In step S422, it is determined whether the value of the variable n is higher than or equal to the value obtained by subtracting '1' from the value of the variable $N_{max}$. If it is determined that the value of the variable n is less than the value obtained by subtracting '1' from the value of the variable $N_{max}$ (No), the operation proceeds to step S424 where a new value for the variable n is set by adding '1' to the value of the variable n. A series of steps of the process is finished and the flow returns to the original processing step.

On the other hand, if it is determined in step S422 that the value of the variable n is higher than or equal to the value obtained by subtracting '1' from the value of the variable $N_{max}$ (Yes), a series of steps of the process is finished and the flow returns to the original processing step.

On the other hand, if it is determined in step S438 that the average article number, $M_{ave}$, is equal to or less than the publishable article number (No), the operation proceeds to step S422.

On the other hand, if it is determined that the operation in step S400 is not the first one (No), the operation proceeds to step S406.

Next, an operation of this embodiment will be described.

In the course of the layout process, steps S300, S400 to S404 are performed to set the layout region of the first page as an object to be processed, '0' as the variable n, and the variable $N_{max}$ as the total number of records of the template application rule. Next, step S406 is performed to obtain a template number from a record in the order specified by the value of the variable n among all the records of the template application rule. At this time, the value of the variable n is '0', so that a template number is obtained from the first record of the template application rule. Then, step S408 is performed to read a page template with the obtained template number from the template registration DB 42.

Further, steps S430 to S434 are performed to calculate the total article number, $M_{sum}$, of the unpublished article, to read the maximum page number, $P_{max}$, and obtain the current page number, $P_{cur}$. Next, step S436 is performed to calculate the average article number, $M_{ave}$, at each of the unprocessed pages according to the aforementioned expression (2) on the basis of the total article number, $M_{sum}$, the maximum page number, $P_{max}$, and the current page number, $P_{cur}$. At this time, if the average article number, $M_{ave}$, is greater than the publishable article number of the page templates read in step S408, it is impossible to secure the publishable article number required to store articles. Therefore, step S440 is performed to read a page template having the publishable article number suitable for the average number of characters, $M_{ave}$, from the template registration DB 42. In other words, instead of the page template read in step S408, the page template read in step S440 is used. Then, steps S422, S424 are performed to set a new value for the variable n by adding '1' to the value of the variable n.

Further, if the average article number, $M_{ave}$, is equal to or smaller than the publishable article number of the page template read in step S408, the publishable article number required to store the article is secured. Thus, the page template read in step S408 is applied to the layout region of the current page. Therefore, a layout is produced according to the template application rule.

As described above, in this embodiment, the content distribution terminal 100 is adapted to select an article from the content registration DB 44 and a page template from the template registration DB 42 according to the number of the selected articles, thereby producing a layout of the articles according to the selected page template.

As a result, even when the number of articles is not clearly determined in advance, a relatively suitable layout can be produced compared to the prior art. Further, the layout is produced in combination of the page templates of each page, so that it is possible to set a layout format relative easily.

Further, in this embodiment, the content distribution terminal 100 is adapted to select page templates of the publishable article number suitable for the number of articles from the template registration DB 42.

As a result, a layout is produced to be further suitable for the number of articles. Therefore, even when the number of the articles is not clearly determined in advance, it becomes possible to produce optimum layout.

Furthermore, in this embodiment, the content distribution terminal 100 is adapted to calculate the total article number, $M_{sum}$, of the unpublished articles, and the average article number, $M_{ave}$, in each unprocessed page on the basis of the total number of characters, $M_{sum}$, maximum page number, $P_{max}$, and current page number, $P_{cur}$, according to the aforementioned expression (2), and select a page template of a publishable number of articles suitable for the calculated average number of articles $M_{ave}$ from the template registration DB 42.

As described above, a layout relatively suitable for the number of articles can be stably produced through a plurality of pages. Thus, an optimum layout can be produced relatively optimum as a whole even when the number of articles is not clearly determined in advance.

Figure 18:
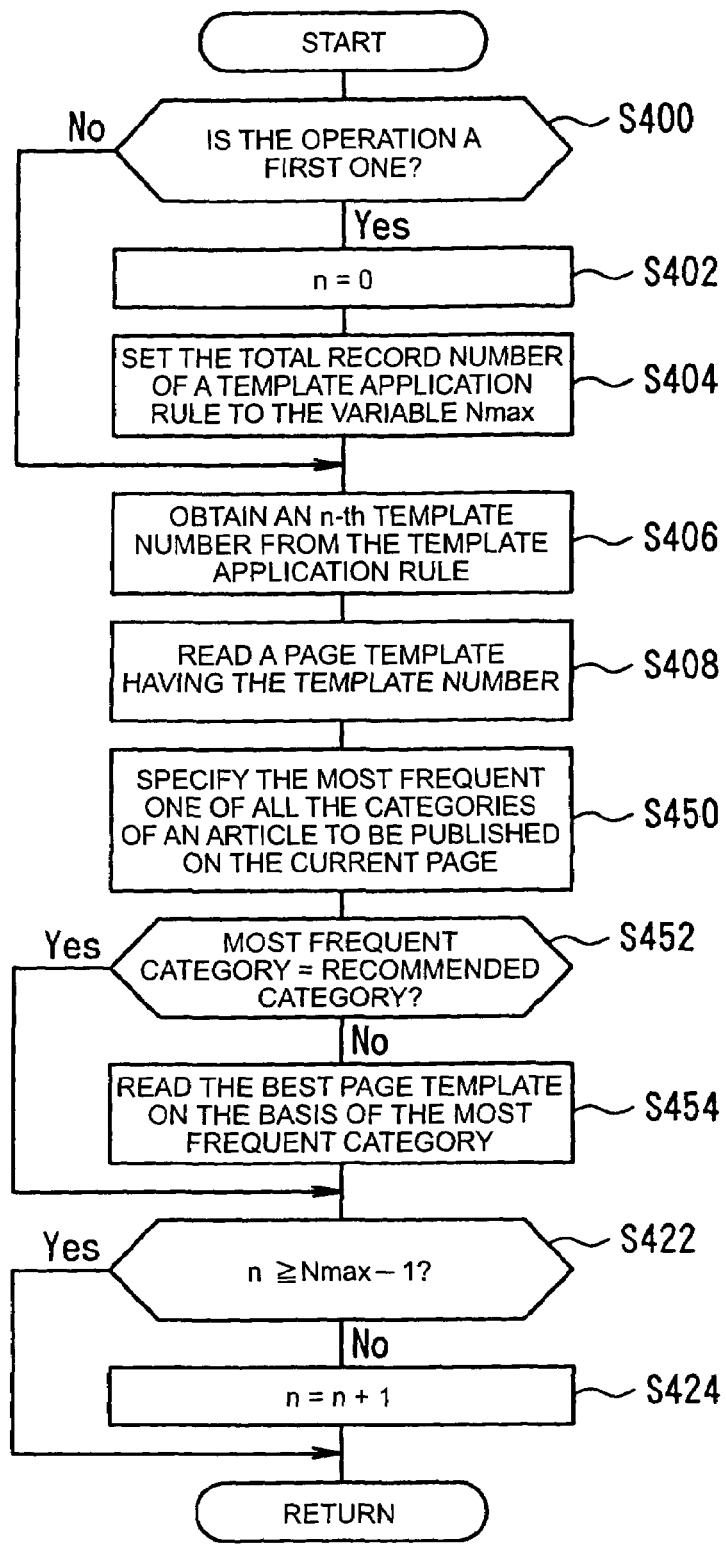
FIG. 18 illustrates a flowchart illustrating an exemplary page template selection process.

Next, a third embodiment of the present invention will be described with reference to the drawings. FIGS. 17 and 18 illustrate the third embodiment of a layout system, a layout program and a layout method according to the present invention.

This embodiment relates to the application of a layout system, a layout program and a layout method according to the present invention to the case in which the content distribution terminal 100 distributes the digital contents, such as news, to the user terminal 200. Different from the first embodiment, the third embodiment has the function of selecting a page template according to the category of articles. Further, hereinafter, a description will be made only about elements of the third embodiment different from those of the first embodiment. The same reference numerals will be given to elements of the third embodiment similar to those of the first embodiment and the description thereof will be omitted.

First, a structure of the page template will be described in detail with reference to FIG. 17. FIG. 17 illustrates an exemplary data structure of a page template.

The page template, as shown in FIG. 17, is adapted to set a layout format by describing a set of tags comprising a beginning tag and an ending tag between a predetermined beginning tag (for example, ) and an ending tag (). In example of FIG. 17, the first page template includes a tag set of tags 500, 502 for setting the image information storage frame, another tag set of tags 504, 506 for setting the arrangement of the image information storage frame in the layout region 360 and a third tag set of tags 516, 518 for setting the recommended category of an article to be stored in the character information storage frame defined in the page template. 'Economy' is described by the tag set of tags 516, 518, which means that it is the best page template for producing a layout of an article including the category named 'economy'. Further, in the example of FIG. 17, a plurality of page templates are described in one template definition file. Thus, each page template can be further specified by the description order of the template definition file.

The CPU 30 is adapted to execute a page template selection process illustrated in the flowchart of FIG. 18 instead of that illustrated in the flowchart of FIG. 14. FIG. 18 is a flowchart illustrating an exemplary page template selection process.

After the page template selection process is performed in step S302, the operation first proceeds to step S400 as shown in FIG. 18.

In step S400, it is determined whether the operation of step S400 is the first one. If it is determined that the operation of step S400 is the first one (Yes), the operation proceeds to step S402 where '0' is set as the variable n and to step S404 where the total number of records of the template application rule is set as the variable $N_{max}$. Then, the operation proceeds to step S406.

In step S406, a template number is obtained from a record in the order specified by the value of the variable n among the records of the template application rule. Then, the operation proceeds to step S408 where the page template with the obtained template number is read from the template registration DB 42 and then to step S450.

In step S450, the most frequent category is specified out of all the categories of an article to be published in the current page for unpublished articles among the digital contents searched out in step S206. Then, the operation proceeds to step S452.

In step S452, it is determined whether the specified most frequent category is identical to the recommended category of the page template read in step S408. If it is determined that the most frequent category is not identical to the recommended category (No), the operation proceeds to step S454 where a page template with the recommended category identical to the most frequent category is read from the template registration DB 42 and to step S422.

In step S422, it is determined whether the value of the variable n is higher than or equal to the value obtained by subtracting '1' from the value of the variable $N_{max}$. If it is determined that the value of the variable n is less than the value obtained by subtracting '1' from the value of the variable $N_{max}$ (No), the operation proceeds to step S424 where a new value for the variable n is set by adding '1' to the value of the variable n. A series of steps of the process is finished and the flow returns to the original processing step.

On the other hand, if it is determined in step S422 that the value of the variable n is higher than or equal to the value obtained by subtracting '1' from the value of the variable $N_{max}$ (Yes), a series of steps of the process is finished and the flow returns to the original processing step.

On the other hand, if it is determined in step S452 that the specified most frequent category is identical to the recommended category of the page template read in step S408 (Yes), the operation proceeds to step S422.

On the other hand, if it is determined in step S400 that the operation in step S400 is not the first one (No), the operation proceeds to step S406.

Next, an operation of this embodiment will be described.

In the course of the layout process, steps S300, S400 to S404 are first performed to set the layout region of the first page as an object to be processed, '0' as the variable n, and the variable $N_{max}$ as the total number of records of the template application rule. Next, step S406 is performed to obtain a template number from a record in the order specified by the value of the variable n among all the records of the template application rule. At this time, the value of the variable n is '0', so that a template number is obtained from the first record of the template application rule. Then, step S408 is performed to read a page template with the obtained template number from the template registration DB 42.

Furthermore, step S450 is performed to specify the most frequent one of all the categories of an article to be published on the current page for unpublished articles. If the most frequent category is not identical to the recommended category of the page template read in step S408, it is impossible to produce a layout specialized for a category of articles. Therefore, step S454 is performed to read from the template registration DB 42 a page template with the recommended category identical to the most frequent category. In other words, instead of the page template read in step S408, the page template read in step S454 is used. Then, steps S422, S424 are performed to set a new value for the variable n by adding '1' to the value of the variable n.

Moreover, if the most frequent category is identical to the recommended category of the page template read in step S408, the page template read in step S408 is applied to the layout region of the current page because it is possible to produce a layout specialized for a category of the article. Therefore, a layout is produced according to the template application rule.

As described above, in this embodiment, the content distribution terminal 100 is adapted to select an article from the content registration DB 44 and to select a page template from the template registration DB 42 according to the category of the selected article, thereby producing a layout of the article according to the selected page template.

As a result, even when the category of an article is not clearly determined in advance, a relatively suitable layout can be produced compared to the prior art. Further, the layout is produced in combination of the page templates of each page, so that it is possible to set a layout format relative easily.

Furthermore, in this embodiment, the content distribution terminal 100 is adapted to select a page template with the recommended category suitable for the category of an article from the template registration DB 42.

As a result, a layout is produced to be relatively suitable for the category of articles. Therefore, even when the category of the article is not clearly determined in advance, it is possible to produce further optimum layout.

Furthermore, in this embodiment, the content distribution terminal 100 is adapted to specify the most frequent one of categories of an article to be published in each page and select a page template with the recommended category suitable for the specified most frequent category from the template registration DB 42 for unpublished articles. As a result, a layout is produced to be further suitable for the category of articles. Therefore, even when the category of the article is not clearly determined in advance, it is possible to produce optimum layout.

Figure 20:
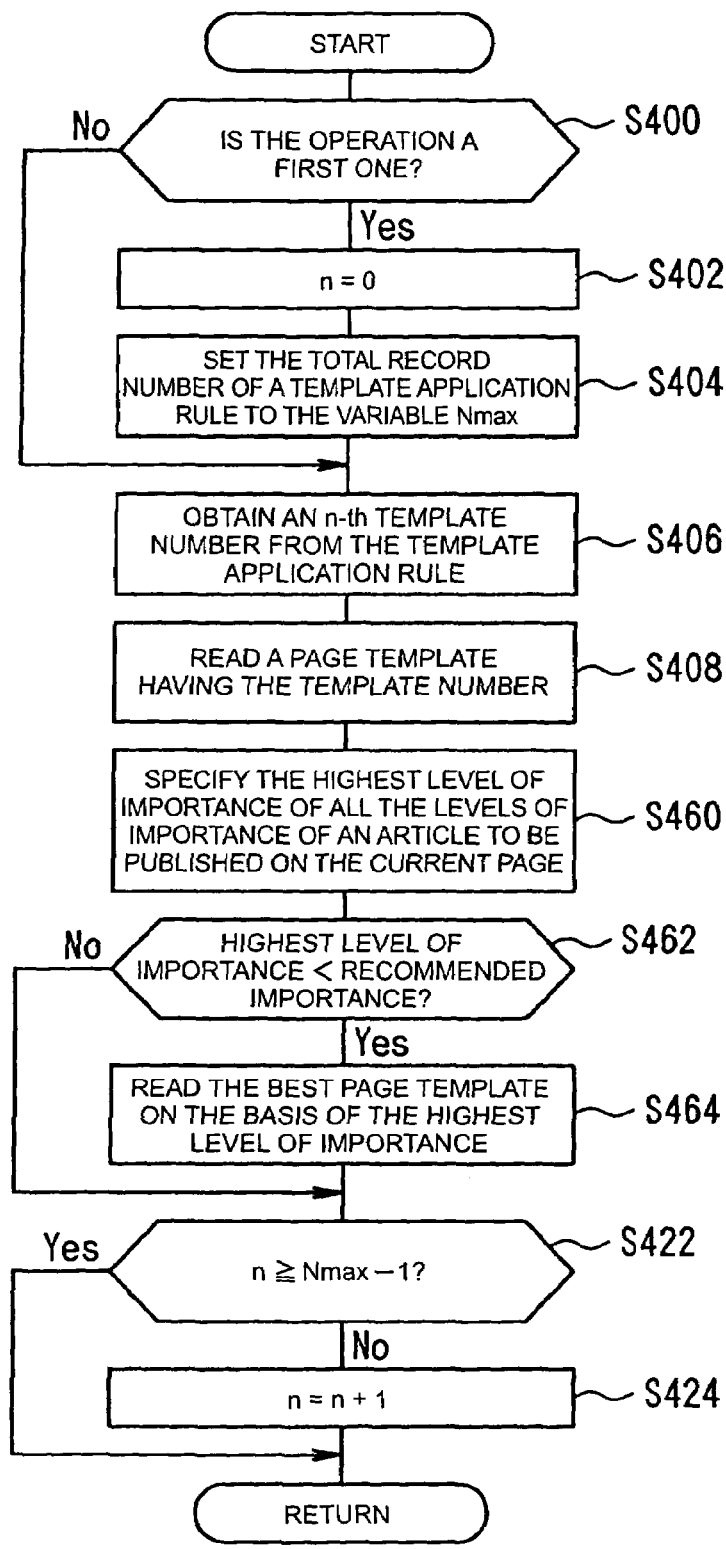
FIG. 20 illustrates a flowchart illustrating an exemplary page template selection process.

Next, a fourth embodiment of the present invention will be described with reference to the drawings. FIGS. 19 and 20 illustrate the fourth embodiment of a layout system, a layout program and a layout method according to the present invention.

This embodiment relates to the application of a layout system, a layout program and a layout method according to the present invention to the case in which the content distribution terminal 100 distributes the digital contents, such as news, to the user terminal 200. Different from the first embodiment, the fourth embodiment has the function of selecting a page template according to the importance of an article. Further, hereinafter, a description will be made only about elements of the fourth embodiment different from those of the first embodiment. The same reference numerals will be given to elements of the fourth embodiment similar to those of the first embodiment and the description thereof will be omitted.

First, a data structure in the page template will be described in detail with reference to FIG. 19. FIG. 19 illustrates the data structure of a page template.

The page template, as shown in FIG. 19, is adapted to set a layout format by describing a set of tags including a beginning tag and an ending tag between a predetermined beginning tag (for example, ) and an ending tag (). In the example of FIG. 19, the first page template includes a tag set of tags 500, 502 for setting the image information storage frame, another tag set of tags 504, 506 for setting the arrangement of the image information storage frame in the layout region 360 and a third tag set of tags 520, 522 for setting the recommended importance of an article to be stored in the character information storage frame defined in the page template. The tag set of tags 520, 522 describes '50', which means that it is the best page template for producing a layout of an article having an importance level of over 50. Further, in the example of FIG. 19, a plurality of page templates are described in one template definition file, so then each page template can be further specified by the record in the order described in the template definition file.

The CPU 30 can be adapted to execute a page template selection process illustrated in the flowchart of FIG. 20 instead of that illustrated in the flowchart of FIG. 14. FIG. 20 is a flowchart illustrating an exemplary page template selection process.

After the page template selection process is performed in step S302, the operation first proceeds to step S400 as shown in FIG. 20. Further, articles to be published are sorted by their levels of importance in the followed process.

In step S400, it is determined whether the operation of step S400 is the first one. If it is determined that the operation of step S400 is the first one (Yes), the operation proceeds to step S402 where '0' is set as the variable n and to step S404 where the total number of records of the template application rule is set as $N_{max}$. Then, the operation proceeds to step S406.

In step S406, a template number is obtained from a record in the order specified by the value of the variable n among the records of the template application rule. The operation proceeds to step S408 where the page template with the obtained template number is read from the template registration DB 42 and then to step S460.

In step S460, a highest level of importance is specified out of all the levels of importance of an article to be published on the current page for unpublished articles among digital contents searched out in step S206. Then, the operation proceeds to step S462.

In step S462, it is determined whether the specified highest level of importance is smaller than the recommended importance of the page template read in step S408. If it is determined that the highest level of importance is smaller than the recommended importance (Yes), the operation proceeds to step S464 where a page template with the recommended importance suitable for the highest level of importance is read from the template registration DB 42 and, then, to step S422.

In step S422, it is determined whether the value of the variable n is higher than or equal to the value obtained by subtracting '1' from the value of the variable $N_{max}$. If it is determined that the value of the variable n is less than the value obtained by subtracting '1' from the value of the variable $N_{max}$ (No), the operation proceeds to step S424 where a new value for the variable n is set by adding '1' to the value of the variable n. A series of steps of the process is finished and the flow returns to the original processing step.

On the other hand, if it is determined in step S422 that the value of the variable n is higher than or equal to the value obtained by subtracting '1' from the value of the variable $N_{max}$ (Yes), A series of steps of the process is finished and the flow returns to the original processing step.

On the other hand, if it is determined in step S462 that the specified highest level of importance is greater than the recommended importance of the page template read in step S408 (No), the operation proceeds to step S422.

On the other hand, if it is determined that the operation in step S400 is not the first one (No), the operation proceeds to step S406.

Next, an operation of embodiment will be described.

In the course of the layout process, steps S300, S400 to S404 are performed to set the layout region of the first page, '0' as the variable n, and the variable $N_{max}$ as the total number of the template application rule. Next, step S406 is performed to obtain a template number from a record in the order specified by the value of the variable n among all the records of the template application rule. At this time, the value of the variable n is '0', so that a template number is obtained from the first record of the template application rule. Then, step S408 is performed to read a page template with the obtained template number from the template registration DB 42.

Furthermore, step S460 is performed to specify the highest level of importance among all the levels of importance of an article to be published on the current page for unpublished articles. If the highest level of importance is smaller than the recommended importance of the page template read in step S408, a level of importance required to store the storage of articles cannot be secured. Therefore, step S464 is performed to read from the template registration DB 42 a page template with the recommended importance suitable for the highest level of importance. In other words, instead of the page template read in step S408, the page template read in step S464 is used. Then, steps S422, S424 are performed to set a new value for the variable n by adding '1' to the value of the variable n.

Moreover, if the highest level of importance is equal to or greater than the recommended importance of the page template read in step S408, the page template read in step S408 is applied to the layout region of the current page because it is possible to secure a level of importance required to store articles. Therefore, a layout is produced according to the template application rule.

As described above, in this embodiment, the content distribution terminal 100 is adapted to select an article from the content registration DB 44 and to select a page template from the template registration DB 42 according to a level of importance of the selected article, thereby producing a layout of articles according to the selected page template. As a result, even when a level of importance of an article is not clearly determined in advance, a relatively suitable layout can be produced compared to the prior art. Further, the layout is produced in combination of the page templates of each page, so that it is possible to set a layout format relative easily.

Moreover, in this embodiment, the content distribution terminal 100 is adapted to select a page template with the recommended importance suitable for the level of importance of an article from the content registration DB 42. As a result, a layout is produced to be further suitable for the level of importance of the articles. Therefore, even when the level of importance of the article is not clearly determined in advance, it is possible to produce optimum layout.

Moreover, in this embodiment, the content distribution terminal 100 is adapted to specify the highest level of importance of articles to be published in each page for unpublished articles and to select a page template with the recommended importance suitable for the specified level of importance from the template registration DB 42. As a result, a layout is produced to be further suitable for the level of importance of articles. Therefore, even when the level of importance of the article is not clearly determined in advance, it is possible to produce optimum layout.

Moreover, in the above first through fourth embodiments, unique template numbers are related to page templates, and a template application rule is constructed by registering the template numbers in a predetermined sequence. The template numbers are obtained from the template application rule in respective layout regions to each of which a layout is required, and the page templates having the obtained template numbers are selected from the template registration DB 42. However, it should be understood that it is not limited thereto, but the system may be constructed such that the page templates are related and managed by unique identification character strings. Specifically, the template application rule is constructed in relation of page template to unique identification character strings and registering the identification character strings in a predetermined sequence. In other words, the identification character strings are obtained from the template application rule in a predetermined sequence in respective layout regions. Then, the page templates corresponding to the obtained identification character strings are selected from the template registration DB 42.

For example, if 'top', 'economy' and 'sports' are described as a template application rule, a page template with identification character string 'top' is applied to the layout region of the first page, another page template with identification character string 'economy' is applied to the layout region of the second page, and a third page template including identification character string 'sports' is applied to the layout region of the third page.

As a result, a template application rule can be set simply by arranging identification character strings, thereby making it possible to make a template application rule in a relatively easy manner.

Further, in the above first through fourth embodiments, the template application rule is made into a single rule, but it is not limited thereto, but may be made in combination of a plurality of rules.

Further, in the above first through fourth embodiments, the system is constructed to determine the shape and position of an information storage frame to avoid any possibility of overlapping with the flow object storage frame when the storage frames are overlapped. However, it is not limited thereto, but the system may be constructed to determine the shape and position of the flow object storage frame to avoid overlapping with another information storage frame when the storage frames are overlapped.

As a result, it is possible to arrange the information to be stored in other information storage frames prior to the arrangement of the flow object.

Further, in the above embodiments, the system is constructed to process character information as a flow object. However, it should be understood that it is not limited thereto, but it may be constructed to process title information or image information. Since it is undesirable that the title information or image information flows out of the title information storage frame or image information storage frame, there is a case that it is much better not to perform the overflow like of the character information in terms of layout.

Further, in the above first through fourth embodiments, character information and image information are adopted as article information. However, it should be understood that it is not limited thereto, but other multimedia data, for example, dynamic image information, voice information may be adopted as article information.

Further, in the above first through fourth embodiments, the system is constructed to determine the shape and position of the information storage frames in the sequence of title information storage frame, image information storage frame and character information storage frame. However, it should be understood that it is not limited thereto, but it may be constructed to determine the shape and position of the information storage frames in a certain sequence. Further, the sequence of determining the shape and position of the information storage frames may be registered in the user profile table 300 as user information.

Further, the above first through fourth embodiments are constructed to produce a layout while the shape and position of the layout frames are dynamically determined. However, it is not limited thereto, and it may be constructed to produce a layout by determining the shape and position of each layout information storage frame after information is once stored in all the information storage frames in the layout region.

Further, in the above first through fourth embodiments, it is constructed to determine an output layout for digital contents on the basis of user information. However, it is not limited thereto, but it may be constructed to determine an output layout for the digital contents on the basis of the number of images or the amount of character information included in the digital contents. As a result, even if the number of images or the amount of character information included in the digital contents becomes larger or smaller, it is possible to produce an output layout to be read with ease.

Further, in the above first through fourth embodiments, it is constructed to perform the process of producing a layout in step S212 in the content distribution terminal 100. However, it is not limited thereto, but it may be constructed to perform the layout process in the user terminal 200. As a result, it is possible to reduce the concentration of the processing load on the content distribution terminal 100.

Further, in the above first through fourth embodiments, a description has been made about a case that a control program previously stored in ROM 32 is carried out for all the processes shown in the flowcharts of FIGS. 11 through 14, 16, 18 and 20. However, it is not limited thereto, but the processes may be carried out by reading the program into RAM 34 from the storage medium in which the program showing the sequence of processes is stored.

The storage medium can include a semiconductor storage medium, such as RAM or ROM, magnetic storage type storage medium such as FD or HD, optical reading type storage medium, such as CD, CDV, LD or DVD, and magnetic storage/optical reading type storage medium, such as MO. Regardless of the electronic, magnetic or optical reading method, it is possible to include any storage medium capable of reading information on the computer.

Further, in the above first through fourth embodiments, a description has been made about a case that the layout system, layout program and layout method of the present invention are applied to a network system constructed by the Internet 199. However, it should be understood that it is not limited thereto, and it may be applied to a case that a communication is made by the same method as the Internet 199, so called, the intranet. It can be taken for granted that the invention is not limited to the network in which the communication is made by the same method as the Internet 199, but it may be applied to a general network.

Further, in the above first through fourth embodiments, the layout system, layout program and layout method according to the invention are applied to distributing digital contents such as news from the content distribution terminal 100 to the user terminal 200 as shown in FIG. 1. However, it should be understood that it is not limited thereto, and it may be applied to other cases without departing from the scope of the invention.

As described above, according to the layout system of the present invention, a template is selected according to the attributes of the published information. Therefore, even when the attributes of the published information are not clearly determined in advance, a relatively suitable layout can be produced compared to the prior art. Further, a layout is produced in combination of templates in predetermined units of layout regions, so that it is possible to set a layout format with relative ease.

Further, according to the layout system defined above, a template is selected according to the amount of published information. Therefore, even when the amount of published information is not clearly determined in advance, a relatively suitable layout can be produced compared to the prior art. Further, a layout is produced in combination of templates in predetermined units of layout regions, so that it is possible to set a layout format with relative ease.

Furthermore, according to the layout system defined above, a layout format is set up in each page according to the amount of published information. Therefore, a layout format can be set relatively in detail, so that it is possible to set a further optimum layout.

Furthermore, according to the layout system defined above, a selection is made for a page template having the amount of publishable information suitable for the amount of published information, so that a layout relatively suitable for the amount of published information is produced. Therefore, it is possible to produce a further optimum layout even when the amount of published information is not clearly determined in advance.

Furthermore, according to the layout system defined above, a page template having the amount of publishable information suitable for the average amount of published information is selected. Therefore, it is possible to produce a stable layout relatively suitable for the amount of published information through a plurality of pages. Thus, even when the amount of published information is not clearly determined in advance, it is possible to produce a relatively optimum layout as a whole.

Furthermore, according to the layout system defined above, a template is selected according to the number of pieces of published information. Therefore, even when the number of pieces of published information is not clearly determined in advance, a relatively suitable layout can be produced compared to the prior art. Further, a layout is produced in combination of templates in predetermined units of layout regions, so that it is possible to set a layout format with relative ease.

Furthermore, according to the layout system defined above, a layout format is set up in each page according to the number of pieces of published information. Therefore, a layout format can be set relatively in detail, so that it is possible to set a further optimum layout.

Furthermore, according to the layout system defined above, a selection is made for a page template of the publishable number suitable for the number of pieces of published information. Thus, it is possible to produce a layout relatively suitable for the number of pieces of published information. Therefore, even when the number of pieces of published information is not clearly determined in advance, it is possible to produce a further optimum layout.

Furthermore, according to the layout system defined above, a selection is made for a page template of publishable number suitable for the average number of publication in each page of published information. Therefore, it is possible to produce a stable layout relatively suitable for the number of pieces of published information through a plurality of pages. Thus, even when the number of pieces of published information is not clearly determined in advance, it is possible to produce a relatively optimum layout as a whole.

Further, according to the layout system defined above, a template is selected according to the content of published information. Therefore, even when the content of published information is not clearly determined in advance, a relatively suitable layout can be produced compared to the prior art. Further, a layout is produced in combination of templates in predetermined units of layout regions, so that it is possible to set a layout format with relative ease.

Moreover, according to the layout system defined above, a layout format could be set in each page according to the content of published information. Therefore, a layout format can be set relatively in detail, so that it is possible to set a further optimum layout.

Furthermore, according to the layout system defined above, a selection is made for a page template with the recommended category suitable for the category of published information. Thus, it is possible to produce a layout relatively suitable for the category of published information. Therefore, even when the category of published information is not clearly determined in advance, it is possible to produce a further optimum layout.

Furthermore, according to the layout system defined above, a selection is made for a page template with the recommended category suitable for the most frequent one of those categories of published information. Therefore, it is possible to produce a layout relatively suitable for the category of published information. Thus, even when the category of published information is not clearly determined in advance, it is possible to produce a further optimum layout.

Further, according to the layout system defined above, a template is selected according to the importance of published information. Therefore, even when the importance of published information is not clearly determined in advance, a relatively suitable layout can be produced compared to the prior art. Further, a layout is produced in combination of templates in predetermined units of layout regions, so that it is possible to set a layout format with relative ease.

Furthermore, according to the layout system defined above, a layout format is set up in each page according to the importance of published information. Therefore, a layout format can be set relatively in detail, so that it is possible to set a further optimum layout.

Furthermore, according to the layout system defined above, a selection is made for a page template with the recommended importance suitable for the importance of published information. Thus, it is possible to produce a layout relatively suitable for the importance of published information. Therefore, even when the importance of published information is not clearly determined in advance, it is possible to produce a further optimum layout.

Furthermore, according to the layout system defined above, a selection is made for a page template with the recommended importance suitable for the maximum level of importance of published information. Therefore, it is possible to produce a layout further suitable for the importance of published information. Thus, even when the importance of published information is not clearly determined in advance, it is possible to produce a further optimum layout.

Furthermore, according to the layout system defined above, published information is selected by reference to the user's inherent information or the information specified by a user. Therefore, it is possible to make published contents relatively suitable for the user's desire.

Furthermore, according to the layout system defined above, a layout is produced by reference to the user's inherent information or the information specified by a user. Therefore, it is possible to produce a layout relatively suitable for the user's desire.

On the other hand, according to the layout program defined above, it is possible to achieve the same effect as the layout system defined above related to the present invention.

On the other hand, according to the layout method defined above, it is possible to achieve the same effect as the layout system defined above related to the present invention.

What is claimed is:

1. A layout system, comprising:
    a published information storage device that stores a plurality of pieces of published information;
    a published information selection device that selects the published information out of the published information storage device;
    a layout device that produces a layout of the published information selected by the published information selection device, the layout device producing a layout by storing the published information in an information storage frame according to a template that defines items related to the information storage frame arranged in a predetermined layout region;
    a template storage device that stores a plurality of different templates; and
    a template selection device that selects a template out of the template storage device according to an average character number per page,
    the layout device producing the layout of the published information according to the selected template selected by the template selection device,
    the average character number per page being based on a total character number of all unpublished articles, a maximum page number to be displayed that stored in a user profile table, and a page number of a layout region to be processed.

2. The layout system according to claim 1, the template being a page template that defines the shape, size, and arrangement of an information storage frame to be arranged in a layout region in page units.

3. The layout system according to claim 2, the page template being related to information that indicates the amount of publishable information which can be stored in the information storage frame defined by a relevant page template.

4. A layout system, comprising:
    a published information storage device that stores a plurality of pieces of published information;
    a published information selection device that selects the published information out of the published information storage device;
    a layout device that produces a layout of the published information selected by the published information selection device, the layout device producing a layout by storing the published information in an information storage frame according to a template that defines items related to the information storage frame to be arranged in a predetermined layout region;
    a template storage device that stores a plurality of different templates; and a template selection device that selects a template out of the template storage device according to an average character number per page, the layout device producing the layout of the published information according to the selected template selected by the template selection device, and the average character number per page being calculated according to the following equation:

$$N_{ave}=N_{sum}/(P_{max}-P_{cur}),$$

$N_{sum}$ being a total character number of all unpublished articles, $P_{max}$ being a maximum page number to be displayed that is inputted by a user and stored in a user profile table, $P_{cur}$ being a page number of a layout region to be processed.

5. The layout system according to claim 4, the template being a page template that defines the shape, size, and arrangement of an information storage frame to be arranged in a layout region in page units.

6. The layout system according to claim 5, the page template being related to information that indicates a publishable number that can be stored in the information storage frame defined by a relevant page template.

7. A layout method, comprising:

producing a layout of published information, the producing the layout including storing the published information in an information storage frame according to a template that defines items related to the information storage frame to be arranged in a predetermined layout region, storing a plurality of different templates in a template storage device, selecting the template during the storing according to an average character number per page, and producing a layout of the published information according to the selected template, the average character number per page being based on a total character number of all unpublished articles, a maximum page number to be displayed that is stored in a user profile table, and a page number of a layout region to be processed.

* * * * *